3,309,358
7-DEAZAADENINE 2',5'- AND 3',5'-DINUCLEOSIDE PHOSPHATE AND PROCESS THEREFOR
Arthur R. Hanze, Kalamazoo, Mich., assignor to The Upjohn Company, Kalamazoo, Mich., a corporation of Delaware
No Drawing. Filed Sept. 20, 1965, Ser. No. 488,799
24 Claims. (Cl. 260—211.5)

The present invention relates to novel organic compounds and is more particularly concerned with dinucleoside 2',5'- and 3',5'-phosphates in which one of the nucleoside moieties is selected from the group consisting of 9-β-D-ribofuranosyl-7-deazapurin-2'-yls and 9 - β - D-ribofuranosyl-7-deazapurin-3'-yls.

The novel products and processes of production thereof can be illustratively represented by the following formulae:

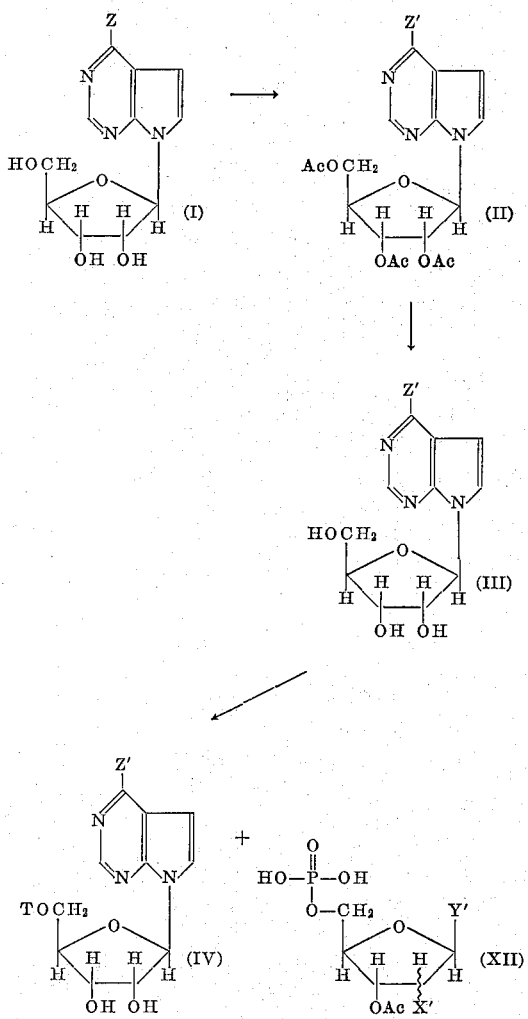

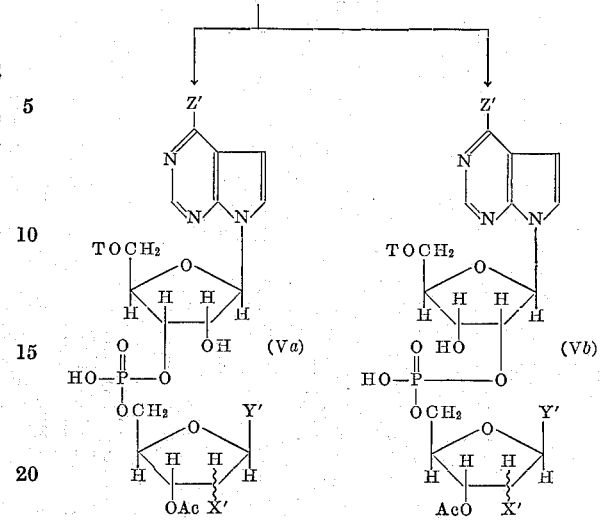

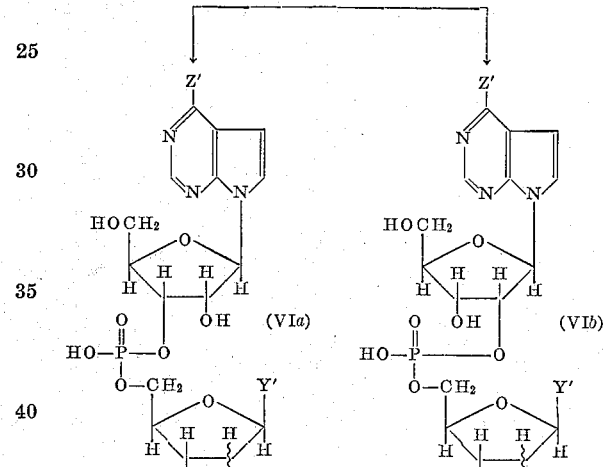

or

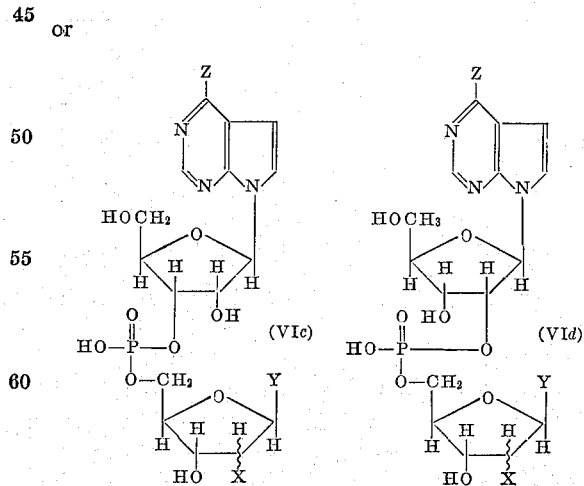

in which the reactant compound XII is produced by the following scheme:

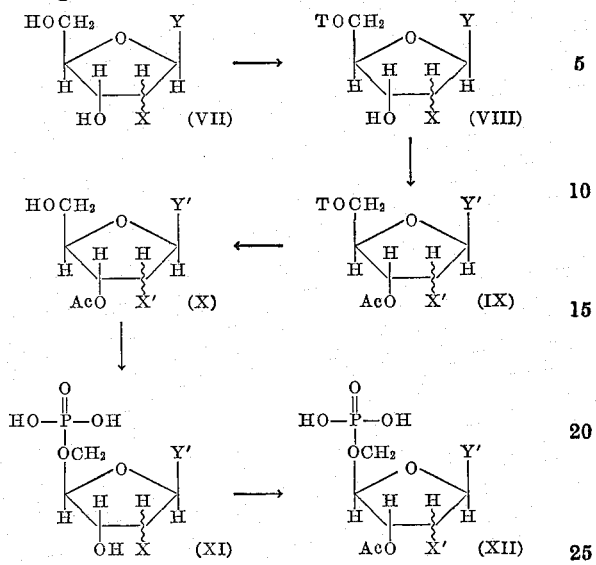

wherein T is selected from the group consisting of triphenylmethyl, (p-methoxyphenyl)diphenylmethyl and bis(p-methoxyphenyl)phenylmethyl; wherein X is selected from the group consisting of hydrogen, α-hydroxy and β-hydroxy, wherein X' is selected from the group consisting of hydrogen, α-OAc and β-OAc in which Ac is the acyl radical of a hydrocarbon carboxylic acid containing from 2 to 12 carbon atoms, inclusive, wherein Z is selected from the group consisting of hydrogen, hydroxy, amino, acylamino, in which the acyl group is defined as above, thio, and alkylthio, in which the alkyl group has from 1 to 4 carbon atoms, inclusive, wherein Z' is selected from the group consisting of hydrogen, hydroxy, acylamino, defined as above, thio and alkylthio, defined as above; wherein Y is selected from the group consisting of cytosin-1-yl, uracil-1-yl, thymin-1-yl (alternatively, 5-methyluracil-1-yl), adenin-9-yl (alternatively, 6-aminopurin-9-yl), guanin-9-yl (alternatively, 2-amino - 6 - hydroxypurin-9-yl), 6-mercaptopurin-9-yl, uracil-3-yl, 5-fluorouracil-1-yl, 5 - chlorouracil-1-yl, 5-bromouracil-1-yl, 5-iodouracil - 1 - yl, 5-trifluoromethyl-uracil-1-yl, hypoxanthin-9-yl (alternatively, 6-hydroxypurin-9-yl), xanthin-9-yl (alternatively, 2,6-dihydroxypurin-9-yl), 5-methylcytosin-1-yl, 3 - methylcytosin-1-yl, 2,6-diaminopurin-9-yl, 5-hydroxymethylcytosin-1-yl, 7-deazaadenin-9-yl, 6-mercapto-7-deazapurin-9-yl, 7-deazahypoxanthin-9-yl, 6-azauracil-1-yl; and wherein Y' signifies a group like Y in which groups capable of acylating, e.g., amino groups, are also acylated and thus protected from reacting with the phosphate ester in positions other than desired.

Thus, Y' is selected from the group consisting of N⁴-acylcytosin-1-yl, uracil-1-yl, thymin-1-yl, N⁶-acyladenin-9-yl, N²-acylguanin-9-yl, 6-mercaptopurin-9-yl, uracil-3-yl, 5-fluorouracil-1-yl, 5-chlorouracil-1-yl, 5-bromouracil-1-yl, 5-iodouracil-1-yl, 5-trifluoromethyluracil-1-yl, hypoxanthin-9-yl, xanthin-9-yl, N⁴-acyl-5-methylcytosin-1-yl, N⁴-acyl-3-methylcytosin-1-yl, N²,N⁶-bis(acylamino)-purin-9-yl; N⁴-acyl-5-0-hydroxymethylcytosin-1-yl, N⁶-acyl-7-deazaadenin-9-yl; 6-mercapto-7-deazapurin-9-yl; 7-deazahypoxanthin-9-yl; and 6-azauracil-1-yl, wherein the acyl group is defined as hereinabove.

The vertical wavy line ⌇ with substituents at both ends is used to indicate that the substituents can be in the α-position (below the plane of the ring) or in the β-position (above the plane of the ring).

Examples of acyl groups of hydrocarbon carboxylic acids, as herein used, include acetyl, propionyl, butyryl, valeryl, isovaleryl, hexanoyl, heptanoyl, octanoyl, nonanoyl, decanoyl, undecanoyl, lauroyl, benzoyl, phenyl-acetyl, phenylpropionyl, p-toluoyl, β-cyclopentylpropionyl, and the like.

The heterocyclic radicals Y are obtained when a hydrogen atom is removed from the parent compound at the position indicated by the number prior to the ending "-yl." The radicals Y have therefore the following formulae:

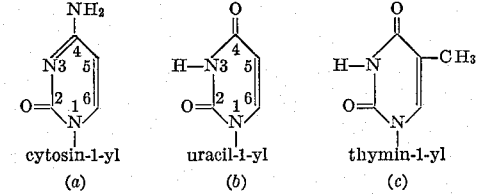

cytosin-1-yl (a)   uracil-1-yl (b)   thymin-1-yl (c)

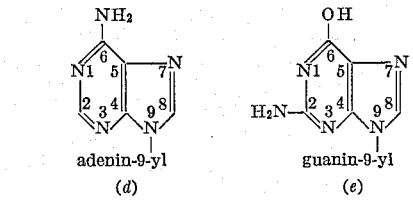

adenin-9-yl (d)   guanin-9-yl (e)

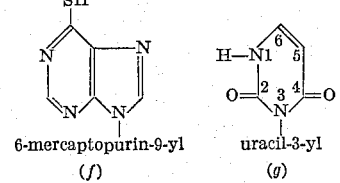

6-mercaptopurin-9-yl (f)   uracil-3-yl (g)

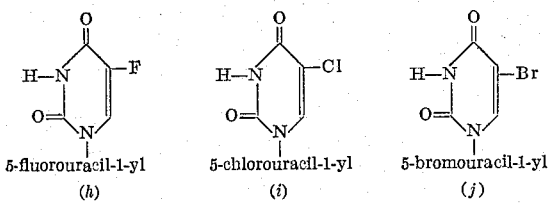

5-fluorouracil-1-yl (h)   5-chlorouracil-1-yl (i)   5-bromouracil-1-yl (j)

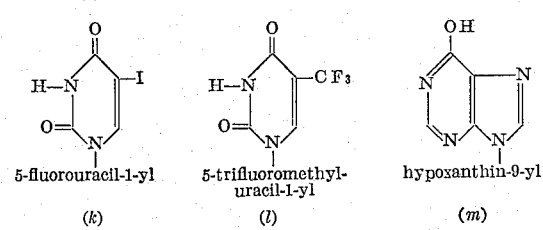

5-fluorouracil-1-yl (k)   5-trifluoromethyl-uracil-1-yl (l)   hypoxanthin-9-yl (m)

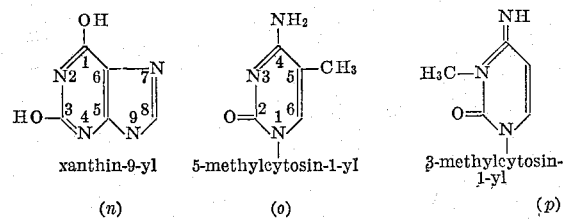

xanthin-9-yl (n)   5-methylcytosin-1-yl (o)   3-methylcytosin-1-yl (p)

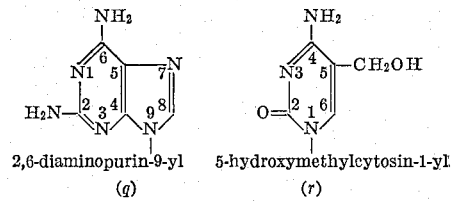

2,6-diaminopurin-9-yl (q)   5-hydroxymethylcytosin-1-yl (r)

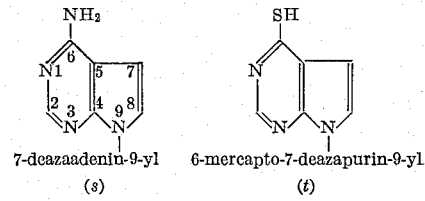

7-deazaadenin-9-yl (s)   6-mercapto-7-deazapurin-9-yl (t)

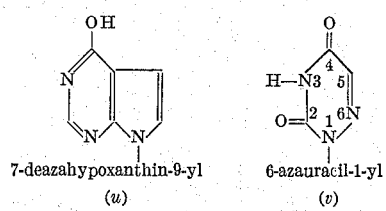

7-deazahypoxanthin-9-yl (u)    6-azauracil-1-yl (v)

The above compounds, e.g., uracil (b) and substituted-uracil radicals (c), (g), (h), (i), (j), (k) and (l) are written in the keto form, rather than in the tautomeric enol form. Likewise, other of the above radicals can be written in tautomeric forms. For example, the cytosine and substituted-cytosine radicals (a) and (o) are written in the amino form, but they can also be written in the tautomeric imino form. In chemical compounds, e.g., the compounds of this invention, such forms may frequently be present in an equilibrium mixture.

The process of the present invention is essentially designed to protect those positions in the N-heterocyclic moiety as well as in the sugar moiety of the molecule which can react with phosphoric acid or the phosphorylating agent and leave at the same time the desired positions 2′ or 3′ and 5′, open to react with the phosphorylating agent. While the process can therefore slightly vary, depending on the selected nucleoside and protecting agent, the basic process can be described as shown in the before disclosed sequence of formulae, in the following manner:

A 9-β-D-ribofuranosyl-7-deazapurin (I) is first converted to the ether compound of Formula IV. If the compound of Formula I possesses an amino group, it is necessary to treat such compound with an acylating agent, generally in pyridine to produce the corresponding ester compound of Formula II, which is esterified on the 2′, 3′ and 5′ position and has at least one additional acyl group on the amino group. Compound II is then selectively hydrolyzed with a base, at low temperatures, to give a compound (III) containing only one acyl group, namely on the amino group, such as a N-acetyl, N-benzoyl, N-phenylacetyl, N-lauroyl and the like. Compound III is treated with a triphenylchloro- or triphenylbromomethane compound, in which additionally one or the other phenyl group may be substituted in the para position with a methoxy group, to give the corresponding ether of Formula IV.

If the selected 9-β-D-ribofuranosyl-7-deazapurine has in the 6-position hydrogen, thio, or acylthio groups or any other group which cannot be acylated, the steps I through III are unnecessary. A compound I with such substituents can be directly converted to compound IV by etherification with triphenylchloromethane, triphenylbromomethane and the like.

The compound of Formula IV is thereupon condensed with a compound of structural Formula XII in the presence of a condensing agent such as N,N′-dicyclohexylcarbodiimine. The two dinucleoside phosphates Va and Vb can be separated from each other by chromatography if desired, or can be used for the subsequent hydrolyses with dilute mineral or dilute organic acids, preferably with 80% aqueous acetic acid to remove the 5′-ether moiety, and either prior to or after the acid hydrolysis with a base to remove any existing acyl groups in the molecules, if so desired; thus providing compounds VIc and VId. If the base is used at low temperature such as 0° to 10° C. and for a short period, such as a period of 30 minutes or less, acyl groups of the ester moieties are removed, but the aminoacyl groups such as on the N6-atom remain (VIa and VIb). When more vigorous conditions are used in the base hydrolysis, e.g., higher temperatures or longer reaction times or both, the acyl group on an amino group is also removed (VIc and VId).

The novel compounds of Formulae VIa, VIb, VIc and VId exhibit significant cytotoxic activity in vitro particularly against KB tumor cells, and against viruses, especially against the different Herpes, Coe and vaccinia viruses. For this reason, the products can be employed for cleaning glassware and instruments used in the growing of tissue culture in virus and tumor research, washing excised tumor tissue intended for transplant into animals, to inhibit the growth of any KB tumor cell that might otherwise seed surrounding tissues or be transported to other parts of the animal body. The antiviral activity can also be used to prepare cultures of microorganisms free of viral phages; e.g., phage-free, antibiotic-producing Streptomyces culture. The compounds of Formula VIa and VIb in which the Z moiety is an amino group; i.e., 7-deazaadenine, are also closely related to adenine which is one of the natural building blocks of deoxynucleic acids (DNA). DNA, of course, controls the protein synthesis and codes the genetic information in the cell. Artificial nucleotides containing 7-deazaadenin rather than adenine are thus of great scientific interest in advanced studies in the biochemical disciplines.

The syntheses of the starting materials of Formulae I and XII are shown in the Preparations.

In carrying out the process of the present invention a selected starting compound of Formula I is acylated with an acylating agent selected from acyl chloride and acid anhydride of hydrocarbon carboxylic acids containing from 2 to 12 carbon atoms, inclusive, in an organic solvent. As solvents pyridine, picolines, lutidines and the like can be used with pyridine preferred. Illustrative acyl chlorides and acyl bromides which can be used for this reaction are acetyl chloride, acetyl bromide, benzoyl chloride, cyclohexanecarbonyl chloride, anisoyl chloride, ethylbenzoyl chlorides, methylbenzoyl bromides, β-cyclopentylpropionyl chloride, lauroyl chloride, decanoyl chloride, octanoyl bromide and the like. Illustrative acid anhydrides include acetic anhydride, propionic anhydride, butyric anhydride, valeric anhydride, phenylacetic anhydride, phenylpropionic anhydride, hexanoic anhydride and the like. In the preferred embodiment of this invention, the acylation reaction is carried out in dry pyridine at room temperature, between 20 and 30° C., under continuous stirring for a period of 1 to 48 hours. After this period, the material is recovered by standard procedures such as pouring the pyridine solution into water, decanting the water, and purifying the remaining material by conventional means such as chromatography, extraction, recrystallization, or a combination of these methods and the like. The thus-obtained 9-(2′,3′,5′-triacyl-β-D-ribofuranosyl)deazapurine which may have additional acyl groups on an amino substituent compound, such as 6-acylamino and 6-diacylamino is thereupon treated with a base such as aqueous sodium hydroxide, aqueous ammonium hydroxide, aqueous lithium hydroxide, sodium methoxide, potassium methoxide and the like, at low temperature, that is between 0 to 10° C., preferably at about 0° C. for a period of 10 to 50 minutes to give the compound of Formula III in which an acylated amino group is still maintained.

Compound III is then treated with an etherifying agent in a basic organic solvent. As etherifying agent, triphenylchloromethane, triphenylbromomethane, (p-methoxyphenyl)diphenylchloro (or bromo)methane and bis(p-methoxyphenyl)phenylchloro(or bromo)methane are generally employed. As an organic base, triethylamine, tributylamine, pyridine, alkylpyridines, e.g., picolines, lutidines, ethylpyridines, diethylpyridines, and the like can be used, with pyridine preferred. The reaction can be carried out at a temperature between 0° and 116° C. The reaction time at room temperature is between 6 hours and 10 days. In the preferred embodiment of this invention, a 9-β-D-ribofuranosyl-7-deazapurine (III) is stirred in pyridine solution with triphenylchloromethane, (p-methoxyphenyl)diphenylchloromethane, or bis(p-methoxyphenyl)phenylchloromethane, or the bromo analogues thereof, for a period of 6 hours to 10 days. Thereafter, the product is isolated by conventional means, such as pouring the mixture into water and separating the product after it has crystallized. The product can be purified by conventional means, such as recrystallization, for example, from acetone. The thus-obtained compound IV, a 9 - (5'-O-triphenylmethyl-β-D-ribofuranosyl) 7-deazapurine can also be obtained directly from a compound of Formula I in which Z is not capable of acylation, by etherifying compound I by the same process used for the etherification of compound III. It is obvious that if parameter Z cannot be acylated, the Formulas I and III are identical.

Compound IV is thereupon condensed with a nucleoside 5'-phosphate of Formula XII. The condensation is carried out with equimolecular amounts of compounds IV and XII in the presence of condensing agent and in an anhydrous solvent. As anhydrous solvents, pyridine, picoline, lutidine and other alkyl substituted pyridines as well as dimethylformamide, diethylformamide and the like can be used. As condensing agent dialkyl and dicycloalkyl carbodiimides are preferred, particularly dicyclohexylcarbodiimide. Other compounds used are dimethylcarbodiimide, diethylcarbodiimides dipropylcarbodiimide, dipentylcarbodiimide, dicyclopentylcarbodiimide, dicyclooctylcarbodiimide, dicycloheptylcarbodiimide and the like. The reaction can be carried out at temperatures between 0° and the boiling point of the mixture, about 116° C. when in boiling pyridine, preferably at room temperature between 20 and 30° C. At about 25° C. the reaction period is between 1 and 10 days, usually between 2 and 6 days. In order to get high yield, the reaction and solvent are used strictly anhydrous. At the termination of the reaction, water is added to destroy the excess condensation agent, which becomes a N,N'-disubstituted urea compound, insoluble in water, and is thus removed by filtration. A mixture of products is obtained possessing the Formulae Va and Vb, which are isolated by conventional methods such as by concentrating the aqueous solution preferrably in vacuo to remove the excess solvent, extracting impurities with water-insoluble solvents such as petroleum ether, diethylether, dibutylether, and the like, and concentrating the aqueous layer. Lyophylization is often used to recover the product and the product may be further purified by conventional methods such as recrystallization, chromatography, electrophoresis and the like. Products Va and Vb can also be separated from each other by the use of chromatography, by solvent distribution in a Craig apparatus, by chromatography and by electrophoresis. Compounds Va and Vb are thereupon submitted to a base hydrolysis and to an acid hydrolysis to remove acyl groups either completely or partially and to remove the triphenylmethyl group or substituted triphenylmethyl group, which is part of the ether moiety. If all of the acyl groups are to be removed, ammonia in aqueous methane or in anhydrous methanol is used, at room temperature for periods of 1 to 48 hours, usually periods of 4 to 24 hours. Instead of ammonium hydroxide, or ammonia in methanol, aqueous sodium hydroxide, aqueous potassium hydroxide, aqueous lithium hydroxide, aqueous barium hydroxide and the like, can be used. These bases are used in a concentration of 0.5 N to 4 N, but lower or higher concentrations can be used. If an acyl group or an amino group is to be maintained, while the acyl groups forming esters are to be removed, the reaction is carried out at low temperature, e.g., at 0 to 5° C. with a short reaction time, usually during 30 minutes and with concentrations of sodium hydroxide, potassium hydroxide or lithium hydroxide, generally between 0.5 N to 1.5 N.

The triphenylmethyl group is removed from compound Va and Vb by acid hyldrolysis either with dilute mineral acid or an aqueous organic acid, preferably with 80% aqueous acetic acid during a period of 2 to 48 hours.

The resulting compounds in solution are isolated by conventional means such as evaporation of the solvents, removing volatile reagents by concentration in high vacuum, precipitating inorganic nonvolatile products and removing them by filtration, and, finally, by chromatographing the resulting products and eluating the column generally with aqueous solution of salts such as, triethylammonium bicarbonate, sodium formate and the like.

The following preparation and examples are illustrative of the products and process of the present invention, but are not to be construed as limiting.

PREPARATION 1

9-β-D-ribofuranosyl-7-deazaadenine (sparsomycin A or tubercidin) by fermentation

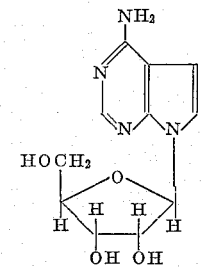

A soil slant of *Streptomyces sparsoquenes* var. *sparsogenes*, NRRL 2940, was used to inoculate a series of 500-ml. Erlenmeyer flasks each containing 100 ml. of seed medium consisting of the following ingredients.

| | |
|---|---|
| Glucose monohydrate | g__ 25 |
| Pharmamedia[1] | g__ 25 |
| Tap water q.s. | l__ 1 |

[1] Pharmamedia is an industrial grade of cottonseed flour produced by Traders Oil Mill Co., Fort Worth, Texas.

The seed medium presterilization pH was 7.2. The seed was grown for 2 days at 28° C. on a Gump rotary shaker operating at 250 r.p.m.

One shake flask of the seed described above (100 ml.) was used to inoculate a 20 liter seed tank containing 15 l. of the above sterile seed medium (S-1) plus 1 ml./l. of lard oil. The seed tank was grown for 24 hours at a temperature of 28° C., aeration rate of 10 standard l./min., and agitated at a rate of 400 r.p.m.

The seed tank, described above, was then used to inoculate a 380-1. fermentor containing 250 l. of the following sterile medium:

| | |
|---|---|
| Glucose monohydrate | g./l__ 10 |
| Dextrin | g./l__ 15 |
| Pharmamedia | g./l__ 20 |
| Wilson's Peptone Liquor No. 159[1] | g./l__ 5 |
| Lard oil | ml./l__ 2 |
| Tap water, balance. | |

[1] Wilson's Peptone Liquor No. 159 is a preparation of hydrolyzed proteins from animal origin.

The fermentation then proceeded for 113 hours during which time the temperature was controlled at 28° C., filtered air supplied at a rate of 100 standard l./minute, and agitation at 28 r.p.m. During the course of the fermentation, 1850 ml. of lard oil was added as an antifoam.

A. RECOVERY OF SPARSOMYCIN A

The whole beer from the above fermentation was adjusted from the harvested pH of 7.1 to pH 2.4 with 350 ml. of sulfuric acid (concentrated) and filtered using 3.6% diatomaceous earth as filter aid. The filter cake was washed with 0.2 volume of deionized water, the clear beer plus wash (vol. 280 l.) was adjusted to pH 7.35 with 300 ml. of 50% aqueous sodium hydroxide and allowed to stand overnight at 10° C. The clear beer was then adjusted to pH 8 with 50 ml. of 50% aqueous sodium hydroxide and stirred for 1 hour with 1% decolorizing carbon and 3% diatomite. The mixture was filtered and the carbon cake washed with 0.2 volume of 20% aqueous acetone. The washed carbon cake was eluted twice with 0.4 volume of 50% aqueous acetone, acidified to pH 2.5 with concentrated sulfuric acid, and the eluates pooled. The pooled acetone eluate (72 l.) was adjusted to pH 6.4 with 30 ml. of 50% aqueous sodium hydroxide and concentrated to an aqueous solution (40 l.). The concentrate was adjusted to pH 5.9 and freeze dried to give 447 g. of lyophilized material.

An additional 1126 g. was obtained by twice repeating the above fermentation and recovery. The combined lyophilized material (1573 g.) was slurried in 10 l. of methanol at 40° C. for 1 hour. Insoluble material was filtered off and washed 3 times with 500 ml. of warm methanol (40° C.). The methanol extracts and washes were combined (11.5 l.) and concentrated in vacuo to a dry preparation weighing 321 g. (HRV–25.3) and assaying 1.25 *Proteus vulgaris* biounits/mg.

B. PURIFICATION OF SPARSOMYCIN A— PARTITION COLUMN 300 g. of the above preparation (HRV–25.3) was placed in a partition column which was prepared and developed in the following manner. A solvent system was made using equal volumes (350 l.) of McIlvaine's pH 6.0 buffer and methyl ethyl ketone. A slurry containing 9.6 kg. of diatomite in 60 l. of upper phase and 4.8 l. of lower phase of the above-described solvent system was poured into a 12" column and packed with 4 p.s.i.g. of nitrogen. The column feed was dissolved in 3 l. of lower phase, slurried with 1920 g. of diatomite and enough upper phase added to make it mobile. The feed was carefully added to the top of the column bed which was covered with a layer of sea sand. The column was eluted with upper phase solvent at a rate of 2 l./minute, 4-l. fractions were collected except at the beginning and end of the column when 20-l. fractions were collected. The fractions were concentrated and bio-activities observed on *P. vulgaris* trays. At this point in the process the separation of sparsomycin and sparsomycin A was effectuated. Further processing purified these components and ultimately resulted in crystalline material.

Fractions 24–34, inclusive, from the above partition column contained the sparsomycin (9-β-D-ribofuranosyl-7-diazaadenine) component.

C. PURIFICATION OF SPARSOMYCIN A

The sparsomycin A component was purified and crystallized in the following manner. Fractions 11–20, inclusive, from the previously described partition column— part C.—contained the sparsomycin A component. These fractions were pooled and concentrated under reduced pressure and 7.2 g. of crystalline material was isolated. These crystals were dissolved in 400 ml. of water and 50 ml. of 0.1 N HCl. The solution was heated gently to facilitate dissolving and then filtered. The clear solution was adjusted to pH 9.0 with 50% aqueous sodium hydroxide and chilled in the refrigerator for 5 hours. The crystals were collected by filtration, washed with water, and dried to give 5.65 g. of preparation ADA–102.1 2 g. of this preparation were then dissolved in 75 ml. of water and 20 ml. of 0.1 N HCl. This clear solution was adjusted to pH 9.0 with 50% aqueous sodium hydroxide. Crystallization started immediately. The solution was left at 25° C. for 7 hours and then the crystals were collected, washed with 25 ml. of water, and dried to yield 1.52 g. of preparation ADA–105.1 having a melting point of 247.8–250° C., an optical rotation $[\alpha]_D^{25}$ −62° (c.=0.718 in 0.1 N HCl), an equivalent weight of 269, pKa' of 5.07 in water, an ultraviolet absorption spectrum in Water _____ 270 mu, a=44.14.
0.01 N $H_2SO_4$ _____ 227 mu, a=85.28;
                                  271 mu, a=40.82.
0.01 N KOH _____ 270 mu, a=43.50.

a characteristic IR absorption at the following frequencies expressed in reciprocal centimeters

| | | |
|---|---|---|
| 3350 (s) | 1426 (m) | 1042 (s) |
| 3250 (s) | 1370 (m) (oil) | 1017 (s) |
| 3145 (s) | 1351 (m) | 992 (s) |
| 3095 (s) (sh) | 1306 (m) | 953 (w) |
| 2880 (s) (oil) | 1276 (w) | 912 (w) |
| 2810 (s) (oil) | 1255 (s) | 903 (m) |
| 1895 (w) | 1241 (m) | 867 (m) |
| 1640 (s) | 1198 (w) | 852 (w) |
| 1592 (s) | 1160 (w) | 842 (w) |
| 1553 (m) | 1134 (m) | 799 (w) |
| 1502 (m) | 1120 (m) | 715 (w) |
| 1475 (m) | 1093 (m) | 704 (s) |
| 1458 (s) (oil) | 1080 (w) | 675 (m) |
| 1445 (m) (sh) | 1055 (m) | 658 (m) | and the following elemental analysis:

*Analysis.*—Calcd. for $C_{11}H_{14}N_4O_4$: C, 49.62; H, 5.30; N, 21.04. Found: C, 49.81; H, 5.20; N, 20.92.

9-β-D-ribofuranosyl-7-deazaadenine (sparsomycin A) was also isolated and purified from fermentation broth in another manner. The fermentation was carried out as described above. The whole beer (APW–63) was adjusted to pH 2.5 with 365 ml. of concentrated sulfuric acid and filtered using 6% diatomaceous earth as filter aid. The filter cake was washed with 0.1 volume of deionized water and the wash added to the clear beer. The clear beer was then adjusted to pH 8.0 with 400 ml. of 50% aqueous sodium hydroxide and stirred 1 hour with 1% decolorizing carbon and 3% diatomaceous. The mixture was filtered and the carbon cake washed with 0.1 volume of deionized water followed by 0.2 volume of 20% aqueous acetone. The washed carbon was eluted twice with 0.4 volume of 40% aqueous acetone which had been acidified to pH 2.5 with concentrated sulfuric acid, and the eluates were pooled. The pooled acetone eluates were then adjusted to pH 4.8 with 53 ml. of 50% aqueous sodium hydroxide, concentrated to an aqueous solution and freeze-dried to yield 284 g. of preparation WMH–32.6 assaying 9KB μ/mhg. in tissue culture. 100 g. of this preparation was then dissolved in 600 ml. of methanol and 4 volumes of ether added to precipitate the inactive material. From the methanolether supernatant 2 crops of crystalline material were isolated by allowing the solvent to evaporate slowly. These preparations were pooled and redissolved in 35 ml. of water and 5 ml. of 0.1 N hydrochloric acid. The solution was then filtered and adjusted to pH 9.4 with 50% aqueous sodium hydroxide. The sparsomycin A which separated in crystalline form was collected, washed with water, and dried to give 480 mg. of preparation ADA–104.1 having a melting point of 247.8–250° C., an optical rotation $[\alpha]_D^{25}$ −61° (c.=0.908 in 0.1 N HCl), an equivalent weight of 270, pka' of 5.05 in water, and ultraviolet absorption spectrum in Water _____ 269.5 mu, a=44.27.
0.01 N $H_2SO_4$ _____ 227 mu, a=86.06.
                                  271 mu, a=41.35.
0.01 N KOH _____ 270 mu, a=43.61.

a characteristic IR absorption at the following frequencies expressed in reciprocal centimeters:

| | | |
|---|---|---|
| 3400 (s) | 1480 (s) | 1092 (s) |
| 3310 (s) | 1462 (s) (oil) | 1084 (m) |
| 3240 (s) | 1425 (s) | 1057 (m) |
| 3220 (s) | 1370 (m) (oil) | 1045 (s) |
| 3140 (s) | 2355 (s) | 1020 (s) |
| 2950 (s) (oil) | 1342 (m) | 995 (s) |
| 2920 (s) (oil) | 1310 (s) | 955 (m) |
| 2850 (s) (oil) | 1285 (m) | 912 (m) |
| 2620 (m) | 1280 (m) | 905 (m) |
| 1910 (w) | 1260 (s) | 870 (s) |
| 1650 (s) | 1245 (s) | 852 (w) |
| 1645 (s) | 1200 (m) | 843 (w) |
| 1600 (s) | 1164 (m) | 800 (m) |
| 1526 (s) | 1147 (s) | 715 (s) |
| 1510 (m) | 1125 (m) | 702 (s) | and the following elemental analysis:

*Analysis.*—Calcd. for $C_{11}H_{14}N_4O_4$: C, 49.62; H, 5.30; N, 21.04. Found: C, 49.62; H, 5.04; N, 20.81.

The characteristics of sparsomycin A, described above, are in good agreement with those reported in the literature for tubercidin. See Anzai, K.; G. Nakamura and S. Suzuki: A new antibiotic, tubercidin. J. Antibiotics, Ser. A, pp. 201–204, September 1957. However, no process whereby tubercidin can be produced is disclosed.

Other deazapurines are prepared from sparsomycin A as shown in detail by John E. Pike, et al. Journal of Heterocyclic Chemistry I, page 159 (1964). Compounds thus prepared include 9-β-D-ribofuranosyl-7-deazapurine, 9-β-D-ribofuranosyl-6-mercapto-7-deazapurine, 9-β-D-ribofuranosyl-6-hydroxy-7-deazapurine and the like.

EXAMPLE 1

$N^6,N^6$-*dibenzoyl-9-(2′,3′,5′-tri-O-benzoyl-β-D-ribofuranosyl)7-deazaadenine*

A solution containing 1.25 gram of sparsomycin A (9-β-D-ribofuranosyl-7-deazaadenine) in 25 ml. of pyridine was cooled to a temperature of 0 to 5° C. To this solution was added 38 ml. of benzoyl chloride and the reaction mixture was allowed to warm up to room temperature. After standing at room temperature for about 20 minutes, the solution was poured into ice water and the thus-obtained solids were recovered by filtration, dried and recrystallized from acetone-water. The crude material, 3.56 gm., of melting point 180 to 182 was recrystallized from 40 ml. of acetone and 4 ml. of water to give 2.7 grams of $N^6,N^6$-dibenzoyl-9-(2′,3′,5′-tri-O-benzoyl-β-D-ribofuranosyl)-7-deazaadenine of melting point 187 to 188° C.

*Analysis.*—Calcd. for $C_{46}H_{34}N_4O_9$: C, 70.22; H, 4.36; N, 7.12. Found: C, 70.40; H, 4.46; N, 7.40.

EXAMPLE 2

*9-(2′,3′,5′-tri-O-acetyl-β-D-ribofuranosyl)6-hydroxy-7-deazapurine*

In the manner given in Example 1, 9-β-D-ribofuranosyl-6-hydroxy-7-deazapurine in pyridine solution was reacted with acetic anhydride to give 9-(2′,3′,5′-tri-O-acetyl-β-D-ribofuranosyl)-6-hydroxy-7-deazapurine.

In the manner given in Example 1, of other $N^6,N^6$-diactyl-9-(2′,3′,5′-tri-O-acyl-β-D-ribofuranosyl)7-deazaadenines are prepared by reacting 9-β-D-ribofuranosyl-7-deazaadenine with an acylating agent selected from the group consisting of acyl chlorides, acyl bromides and acid anhydrides of hydrocarbon carboxylic acids containing from 2 to 12 carbon atoms, inclusive. Other representative compounds thus produced include.

$N^6,N^6$-dipropionyl-9-(2′,3′,5′-tri-O-propionyl-β-D-ribofuranosyl(7-deazaadenine;
$N^6,N^6$-dibutyryl-9-(2′,3′,5′-tri-O-butyryl-β-D-ribofurnaosyl)7-deazaadenine;
$N^6,N^6$-divaleryl-9-(2′,3′,5′-tri-O-valeryl-β-D-ribofuranosyl)7-deazaadenine;
$N^6,N^6$-dihexanoyl-9-(2′,3′,5′-tri-O-hexanoyl-β-D-ribofuranosyl)7-deazaadenine;
$N^6,N^6$-dioctanoyl-9-(2′,3′,5′-tri-O-octanoyl-β-D-ribofuranosyl)7-dezaadenine;
$N^6,N^6$-didecanoyl-9-(2′,3′,5′-tri-O-decanoyl-β-D-ribofuranosyl)7-deazaadenine;
$N^6,N^6$-diphenylpropionyl-9-(2′,3′,5′-tri-O-phenylpropionyl-β-D-ribofuranosyl)7-deazaadenine;
$N^6,N^6$-dianisoyl-9-(2′,3′,5′-tri-O-anisoyl-β-D-ribofuranosyl)7-deazaadenine, and the like.

EXAMPLE 3

$N^6$-*benzoyl-9-β-D-ribofuranosyl-7-deazaadenine*

A solution of 0.5 gm. of $N^6,N^6$-dibenzoyl-9-(2′,3′,5′-tri-O-benzoyl-β-D-ribofuranosyl)7-deazaadenine in 25 ml. of anhydrous methanol and 25 ml. of anhydrous tetrahydrofuran was treated in an ice bath with 0.5 ml. of a solution containing 25% sodium methylate in methanol. The reaction, which was followed by thin layer chromatography on silica gel (50% acetone-Skellysolve B hexanes) was completed after 6 hours. The solution was kept in the freezing compartment of a refrigerator overnight and the sodium ions were then removed by filtration, the filtrate was concentrated to yield a syrup which was crystallized from isopropyl alcohol and then from methanol-isopropyl alcohol to yield 65 mg. of $N^6$-benzoyl-9-β-D-ribofuranosyl-7-deazaadenine of melting point 181 to 182° C.

*Analysis.*—Calcd. for $C_{18}H_{18}N_4O_5$ (370.36): C, 58.37; H, 4.90; N, 15.13. Found: C, 58.42, H, 4.96; N, 14.96.

EXAMPLE 4

$N^6$-*acetoxy-9-β-D-ribofuranosyl-7-deazaadenine*

In the manner given in Examples 3, $N^6$-acetoxy-9-(2′,3′,5′-tri-O-acetyl-β-D-ribofuranosyl)7-deazaadenine was hydrolyzed in an ice bath for a period of 4 hours to give $N^6$-acetoxy-9-β-D-ribofuranosyl-7-deazaadenine.

In the same manner given in Example 3 other $N^6$-acyl-9-β-D-ribofuranosyl-7-deazaadenine are produced by hydrolyzing selectively $N^6,N^6$-diacyl-9-(2′,3′,5′-tri-O-acyl-β-D-ribofuranosyl)7-deazaadenine. Representative compounds thus obtained include
$N^6$-propionyl-9-β-D-ribofuranosyl-7-deazaadenine,
$N^6$-butyryl-9-β-D-ribofuranosyl-7-deazaadenine,
$N^6$-valeryl-9-β-D-ribofuranosyl-7-deazaadenine,
$N^6$-hexanoyl-9-β-D-ribofuranosyl-7-deazaadenine,
$N^6$-octanoyl-9-β-D-ribofuranosyl-7-deazaadenine,
$N^6$-nonanoyl-9-β-D-ribofuranosyl-7-deazaadenine,
$N^6$-decanoyl-9-β-D-ribofuranosyl-7-deazaadenine,
$N^6$-phenylpropionyl-9-β-D-ribofuranosyl-7-deazaadenine, and the like.

EXAMPLE 5

$N^6$-*benzoyl-9-[5′-O-(p-methoxyphenyl)diphenylmethyl-β-D-ribofuranosyl]7-deazaadenine*

A solution of 1.5 gm. (4.05 millimoles) of $N^6$-benzoyl-9-β-D-ribofuranosyl-7-deazaadenine and 1.8 gm. (6.08 millimoles) of p-methoxyphenyldiphenylchloromethane was reacted in 30 ml. of pyridine for a period of 4 hours at room temperature (about 24° C.). The solution was concentrated in a high vacuum and the residue which resulted was dissolved in ethyl acetate. The ethyl acetate solution was washed with water, dried over anhydrous sodium sulfate, filtered and concentrated to dryness under reduced pressure. The resulting residue was crystallized from benzene to give in 3 crops 1.37 g. of $N^6$-benzoyl-9-[5'-O-(p-methoxyphenyl)diphenylmethyl-β - D - ribofuranosyl]7-deazaadenine of melting point 168–171° C. A further recrystallization gave analytically pure material having a melting point of 170–171° C.

Analysis.—Calcd. for $C_{38}H_{34}N_4O_6$: C, 71.01; H, 5.33; N, 8.72. Found: C, 70.86; H, 5.58; N, 9.38, 9.34.

EXAMPLE 6

9-(5'-O-triphenylmethyl-β-D-ribofuranosyl)7-deazapurine

In the manner given in Example 5, 9-β-D-ribofuranosyl-7-deazapurine was reacted in pyridine solution with tritylbromide (triphenylbromoethane) to give 9-(5'-O-triphenylmethyl-β-D-ribofuranosyl)7-deazapurine.

EXAMPLE 7

9-[5'-O-p-methoxyphenyl)diphenylmethyl-β-D-ribofuranosyl]6-mercapto-7-deazapurine In the manner given in Example 5, 9-β-D-ribofuranosyl-6-mercapto-7-deazapurine was reacted in pyridine with (p-methoxyphenyl)diphenylchloro methane to give 9-[5'-O-(p-methoxyphenyl)-diphenylmethyl-β-D - ribofuranosyl]-6-mercapto-7-deazapurine.

EXAMPLE 8

9-(5'-O-triphenylmethyl-β-D-ribofuranosyl)-6-hydroxyribofuranosyl-7-deazapurine

In the manner given in Example 5, 9-β-D-ribofuranosyl-6-hydroxy-7-deazapurine was reacted with triphenylchloromethane in pyridine to give 9-(5'-O-triphenylmethyl-β-D-ribofuranosyl)-6-hydroxy-7-deazapurine.

EXAMPLE 9

9-(5'-O-triphenylmethyl-β-D-ribofuranosyl)-6-methylmercapto-7-deazapurine

A. 9-β-D-RIBOFURANOSYL-6-METHYLMERCAPTO-7-DEAZAPURINE

A solution of 9-β-D-ribofuranosyl-6-mercapto-7-deazapurine (1 gm.) in 8 ml. of 0.4 N sodium hydroxide was shaken at about 24° C. for a period of 10 minutes while .21 ml. of methyl iodide was added in portions. Another portion of 1.3 ml. of 0.4 N sodium hydroxide was added and the solution was shaken again with 0.21 ml. of methyl iodide. The reaction mixture was allowed to stand for 4 hours at room temperature and thereupon in a refrigerator over night for 20 hours at about 0 to 5° C. The solids which separated were collected and filtered, dried over sodium hydroxide, refluxed for several minutes with 6 ml. of absolute methanol and chilled yielding white needles which were recovered by filtration. The white material was 9-β-D-ribofuranosyl-6-methylmercapto-7-deazapurine.

B. 9-(5'-O-TRIPHENYLMETHYL-β-D-RIBOFURANOSYL)-6-METHYLMERCAPTO-7-DEAZAPURINE

In the manner given in Example 5, 9-β-D-ribofuranosyl-6-methylmercapto-7-deazapurine was reacted with triphenylbromomethane in pyridine to give 9-(5'-O-triphenylmethyl-β-D-ribofuranosyl)-6-methylmercapto - 7 - deazapurine.

Substituting in Example 9A for methyl iodide another lower alkyl iodide, e.g. ethyl iodide, propyl iodide, isopropyl iodide, butyl iodide, isobutyl iodide and the like other 9-β-D-ribofuranosyl - 6 - alkylmercapto-7-deazapurines are obtained such as 9-β-D-ribofuranosyl-6-ethylmercapto-7-deazapurine; 9-β-D-ribofuranosyl - 6 - propylmercapto-7-deazapurine; 9 - β - D - ribofuranosyl-6-isopropylmercapto - 7 - deazapurine-9-β-D-ribofuranosyl - 6 - butylmercapto-7-deazapurine and the like.

In the manner given in Example 5, these compounds can be etherified in the 5'-position with triphenylmethyl and substituted triphenylmethyl halides. Representative compounds thus obtained include:

9-(5'-O-triphenylmethyl-β-D-ribofuranosyl)-6-ethylmercapto-7-deazapurine;
9-(5'-O-triphenylmethyl-β-D-ribofuranosyl)-6-propylmercapto-7-deazurpurine;
9-(5'-O-triphenylmethyl-β-D-ribofuranosyl-6-isopropylmercapto-7-deazapurine;
9-(5'-O-triphenylmethyl-β-D-ribofuranosyl)-6-butylmercapto-7-deazapurine;
9-(5'-O-triphenylmethyl-β-D-ribofuranosyl)-6-isobutylmercapto-7-deazapurine;
9-[5'-O-(p-methoxyphenyl)diphenylmethyl-β-D-ribofuranosyl]-6-ethylmercapto-7-deazapurine;
9-[5'-O-(p-methoxyphenyl)diphenylmethyl-β-D-ribofuranosyl]-6-butylmercapto-7-deazapurine and the like.

In the manner given in Example 5, other $N^6$-acyl-9-(5'-O-triphenylmethyl- and p-methoxy-substituted triphenylmethyl-β-D-ribofuranosyl)-7-deazaadenines can be obtained by reacting a $N^6$-acyl-9-β-D-ribofuranosyl-7-deazaadenine with a selected etherifying agent such as triphenylchloromethane, triphenylbromomethane, (p-methoxyphenyl)diphenylchloromethane, (p - methoxyphenyl)-diphenylbromomethane, bis (p - methoxyphenyl) phenylbromomethane, and bis(paramethoxyphenyl)phenylchloromethane and the like. Representative compounds thus obtained include:

$N^6$-propionyl-9-(5'-O-triphenylmethyl-β-D-ribofuranosyl)7-deazaadenine;
$N^6$-butyryl-9-(5'-O-triphenylmethyl-β-D-ribofuranosyl)7-deazaadenine;
$N^6$-valeryl-9-(5'-O-triphenylmethyl-β-D-ribofuranosyl)7-deazaadenine;
$N^6$-lauroyl-9-(5'-O-triphenylmethyl-β-D-ribofuranosyl)7-deazaadenine;
$N^6$-hexanoyl-9-[5'-O-(p-methoxyphenyl)diphenylmethyl-β-D-ribofuranosyl]7-deazaadenine;
$N^6$-acetyl-9-[5'-O-(p-methoxyphenyl)diphenylmethyl-β-D-ribofuranosyl]7-deazaadenine;
$N^6$-hexanoyl-9-[5'-O-bis(p-methoxyphenyl)phenylmethyl- β-D-ribofuranosyl]7-deazaadenine;
$N^6$-octanoyl-9-[5'-O-(p-methoxyphenyl)diphenylmethyl-β-D-ribofuranosyl]7-deazaadenine;
$N^6$-decanoyl-9-[5'-O-(p-methoxyphenyl)-diphenylmethyl-β-D-ribofuranosyl]7-deazaadenine;
$N^6$-undecanoyl-9-[5'-O-(p-methoxyphenyl)diphenylmethyl-β-D-ribofuranosyl]7-deazaadenine;
$N^6$-acetyl-9-(5'-O-bis(p-methoxyphenyl)phenylmethyl-β-D-ribofuranosyl]7-deazaadenine;
$N^6$-propionyl-[5'-O-bis(p-methoxyphenyl)phenylmethyl-β-D-ribofuranosyl]7-deazaadenine;
$N^6$-heptanoyl-9-[5'-O-bis(p-methoxyphenyl)phenylmethyl-β-D-ribofuranosyl]7-deazaadenine;
$N^6$-anisoyl-9-[5'-O-bis(p-methoxyphenyl)phenylmethyl-β-D-ribofuranosyl]7-deazaadenine;
$N^6$-diphenylacetyl-9-[5'-O-bis(p-methoxyphenyl)phenylmethyl-β-D-ribofuranosyl]7-deazaadenine;
$N^6$-lauroyl-9-[5'-O-bis(p-methoxyphenyl)phenylmethyl-β-D-ribofuranosyl]7-deazaadenine;
$N^6$-(β-cyclopentylpropionyl)-9-[5'-O-bis(p-methoxyphenylmethyl-β-D-ribofuranosyl]7-deazaadenine;
$N^6$-phenylpropionyl-9-[5'-O-bis(p-methoxyphenyl)phenylmethyl-β-D-ribofuranosyl]7-deazaadenine and the like.

PREPARATION 2

1-(5'-O-triphenylmethyl-β-D-arabinofuranosyl)-cytosine

To a solution of 10 g. of 1-β-D-arabinofuranosylcytosine hydrochloride in 200 ml. of pyridine was added 12 g. of triphenylchloromethane. The reaction mixture was thereupon stirred at room temperature (23–26° C.) for 1 week. The reaction mixture was then poured with stirring into 3 l. of ice water whereupon 1-(5'-O-triphenylmethyl-β-D-arabinofuranosyl)cytosine separated as an oil. The oil solidified on standing with water overnight, and the solids were recovered by filtration, then broken up, washed thoroughly with water and air dried. The thus-obtained solids were triturated with 200 ml. of boiling heptane and the mixture filtered, collecting the insoluble material on a sintered glass funnel. The solids were again washed with 250 ml. portions of boiling acetone containing 1 g. of active charcoal (Darco G60). The hot suspension was filtered to remove the charcoal and the filtrate was distilled on a steam bath to a volume of about 75 ml. which was allowed to cool to room temperature, thereby giving a crystalline product. The crystalline product was collected on a sintered glass funnel and washed with one 25-ml. portion of acetone, priorly cooled with ice. The product was thereupon dried giving 13 g. of 1-(5'-O-triphenylmethyl-β-D-arabinofuranosyl) - cytosine of melting point 227.5–228° C. with decomposition.

Analysis.—Calc'd for $C_{28}H_{27}N_3O_5$: C, 69.26; H, 5.61; N, 8.86. Found: C, 69.09; H, 5.67; N, 8.93.

In the same manner, 1'-[5'-O-(p-methoxyphenyl)diphenylmethyl- or 1-[5' - O - bis(p-methoxyphenyl)phenylmethyl-β-D-arabinofuranosyl]-cytosine can be obtained by reacting cytosine arabinoside or its hydrochloride in pyridine solution with (p-methoxyphenyl)diphenylchloromethane or bis(p-methoxyphenyl)phenylchloromethane at a temperature between 0 and 60° under continuous stirring.

Similarly to Preparation 2, instead of triphenylchloromethane, triphenylbromomethane can be used to give the same final product 1-(5'-O-triphenylmethyl-β-D-arabinofuranosyl)cytosine.

PREPARATION 3

1-(5'-O-triphenylmethyl-β-D-arabinofuranosyl)uracil

In the manner given in Preparation 2, 1-(β-D-arabinofuranosyl)thymine was reacted with triphenylchloromethane in pyridine to give 1-(5'-O-triphenylmethyl-β-D-arabinofuranosyl)thymine.

PREPARATION 4

1-(5'-O-triphenylmethyl-β-D-arabinofuranosyl)thymine

In the manner given in Preparation 2, 1-[β-D-arabinofuranosyl)adenine was reacted with triphenylbromomethane in pyridine to give 9-(5'-O-triphenylmethyl-β-D-arabinofuranosyl)thymine.

PREPARATION 5

9-(5'-O-triphenylmethyl-β-D-arabinofuranosyl)adenine

In the manner given in Preparation 2, 9-(β-D-arabinofuranosyl)adenine was reacted with triphenylbromomethane in pyridine to give 9-(5'-O-triphenylmethyl-β-D-arabinofuranosyl)adenine.

PREPARATION 6

9-[5'-O-(p-methoxyphenyl)diphenylmethyl-β-D-arabinofuranosyl]adenine

In the manner given in Preparation 2, 9-(β-D-arabinofuranosyl)adenine was reacted with (p-methoxyphenyl)diphenylchloromethane in pyridine to give 9-[5'-O-(p-methoxyphenyl)diphenylmethyl-β-D - arabinofuranosyl]adenine.

PREPARATION 7

9-(5'-O-triphenylmethyl-β-D-arabinofuranosyl) (6-mercaptopurine)

In the manner given in Preparation 2, 9-(β-D-arabinofuranosyl)-6-mercaptopurine was reacted with triphenylchloromethane in pyridine to give 9-(5'-O-triphenylmethyl-β-D-arabinofuranosyl) (6-mercaptopurine).

PREPARATION 8

1-(5'-O-triphenylmethyl-β-D-arabinofuranosyl)5-chlorouracil

In the manner given in Preparation 2, 1-(β-D-arabinofuranosyl)5-chlorouracil was reacted with triphenylbromomethane in pyridine to give 1-(5'-O-triphenylmethyl-β-D-arabinofuranosyl)5-chlorouracil.

PREPARATION 9

1-(5'-O-triphenylmethyl-β-D-ribofuranosyl)5-trifluoromethyluracil

In the manner given in Preparation 2, 1-(β-D-ribofuranosyl)5-trifluoromethyluracil was reacted with triphenylchloromethane in pyridine to give 1-(5'-O-triphenylmethyl-β-D-ribofuranosyl)5-trifluoromethyluracil.

PREPARATION 10

1-(5'-O-triphenylmethyl-β-D-ribofuranosyl)cytosine

In the manner given in Preparation 2, 1-(β-D-ribofuranosyl)cytosine was reacted with triphenylchloromethane in pyridine to give 1-(5'-O-triphenylmethyl-β-D-ribofuranosyl)cytosine.

PREPARATION 11

1-(5'-O-triphenylmethyl-β-D-ribofuranosyl)3-methylcytosine

In the manner given in Preparation 2, 1-(β-D-ribofuranosyl)3-methylcytosine was reacted with triphenylchloromethane in pyridine to give 1-(5'-O-triphenylmethyl-β-D-ribofuranosyl)3-methylcytosine.

PREPARATION 12

1-(5'-O-triphenylmethyl-β-D-deoxytribofuranosyl)uracil

In the manner given in Preparation 2, 1-(β-D-deoxyribofuranosyl)uracil was reacted with triphenylchloromethane to give 1-(5'-O-triphenylmethyl-β-D-deoxyribofuranosly)uracil.

PREPARATION 13

1-(5'-O-triphenylmethyl-β-D-deoxyribofuranosyl)cytosine

In the manner given in Preparation 2, 1-(β-D-deoxyribofuranosyl)cytosine was reacted with triphenylchloromethane in pyridine to give 1-(5'-O-triphenylmethyl-β-D-deoxyribofuranosyl)cytosine.

PREPARATION 14

9-(5'-O-triphenylmethyl-β-D-deoxytribofuranosyl)adenine

In the manner given in Preparation 2, 9-(β-D-deoxyribofuranosyl)adenine was reacted with triphenylbromomethane in pyridine to give 9-(5'-O-triphenylmethyl-β-D-deoxyribofuranosyl)adenine.

PREPARATION 15

1-[5'-O-(p-methoxyphenyl)diphenylmethyl-β-D-deoxyribofuranosyl]5-iodouracil

In the manner given in Preparation 2, 1-(β-D-deoxyribofuranosyl)5-iodouracil was reacted with (p-methoxyphenyl)diphenylchloromethane in pyridine to give 1-[5'-O - (p - methoxyphenyl)diphenylmethyl - β-D-deoxyribofuranosyl]5-iodouracil.

PREPARATION 16

1-(5'-O-triphenylmethyl-β-D-deoxytribofuranosyl)5-fluorouracil

In the manner given in Preparation 2, 1-(β-D-deoxyribofuranosyl)5-fluorouracil was reacted with triphenylchloromethane in pyridine to give 1-(5'-O-triphenyl-β-D-deoxyribofuranosyl)5-fluorouracil.

PREPARATION 17

1-(5'-O-triphenylmethyl-β-D-deoxyribofuranosyl) thymine

In the manner given in Preparation 2, 1-(β-D-deoxyribofuranosyl)thymine was reacted with triphenylchloromethane in pyridine to give 1-(5'-O-triphenylmethyl-β-D-deoxyribofuranosyl)thymine.

PREPARATION 18

9-(5'-O-triphenylmethyl-β-D-deoxyribofuranosyl) guanine

In the manner given in Preparation 2, 9-(β-D-deoxyribofuranosyl)guanine was reacted with triphenyl bromomethane in pyridine to give 9-(5'-O-triphenylmethyl-β-D-deoxyribofuranosyl)guanine.

PREPARATION 19

9-[5'-O-(p-methoxyphenyl)diphenylmethyl-β-D-deoxyribofuranosyl]xanthine

In the manner given in Preparation 2, 9-(β-D-arabinofuranoxyl)xanthine was reacted with (p-methoxyphenyl)diphenylchloromethane in pyridine to give 9-[5'-O-(p-methoxyphenyl)diphenylmethyl - β-D-arabinofuranosyl] xanthine.

PREPARATION 20

9-[5'-O-(p-methoxyphenyl)diphenylmethyl-β-D-deoxyribofuranosyl]hypoxanthine

In the manner given in Preparation 2, 9-(β-D-deoxyribofuranosyl)hypoxanthine was reacted with (p-methoxyphenyl)diphenylchloromethane in pyridine to give 9 - [5' - O-(p-methoxyphenyl)diphenylmethyl-β-D-deoxyribofuranosyl]hypoxanthine.

In the same manner given in Preparation 2, other 1-[5'-trityl-, 1-[5'-(p-methoxyphenyl)diphenylmethyl-, and 1 - [5' - bis(p-methoxyphenyl)phenylmethyl-β-D-ribofuranose and deoxyribofuranose] N-heterocyclic compounds can be prepared by reacting a compound selected from triphenylchloromethane, triphenylbromomethane, (p-methoxyphenyl)diphenylchloro(or bromo)methane and bis(p-methoxyphenyl)phenylchloro(or bromo)methane with a 1 - [β-D-ribofuranosyl(deoxyribofuranosyl)N-heterocyclic to give a compound of Formula VIII. Representative compounds of Formula VIII thus produced include:

9-(5'-O-triphenylmethyl-β-D-ribofuranosyl)guanine,
1-(5'-O-triphenylmethyl-β-D-ribofuranosyl)5-bromouracil,
1,(5'-O-triphenylmethyl-β-D-ribofuranosyl)5-ioduracil,
9-(5'-O-triphenylmethyl-β-D-ribofuranosyl)hypoxanthine,
9-(5'-O-triphenylmethyl-β-D-ribofuranosyl)xanthine,
9-(5'-O-triphenylmethyl-β-D-deoxyribofuranosyl)hypoxanthine,
1-(5'-O-triphenylmethyl-β-D-deoxyribofuranosyl)thymine,
1-(5'-O-triphenylmethyl-β-D-deoxyribofuranosyl)5-methylcytosine,
1-(5'-O-triphenylmethyl-β-D-deoxyribofuranosyl)5-trifluoromethyluracil,
1-(5'-O-triphenylmethyl-β-D-deoxyribofuranosyl)5-bromouracil,
1-[5'-O-(p-methoxyphneyl)diphenylmethyl-β-D-deoxyribofuranosyl]5-chlorouracil,
9-(5'-O-triphenylmethyl-β-D-deoxyribofuranosyl)6-mercaptopurin,
1-[5'-O-bis(p-methoxyphenyl)phenylmethyl-β-D-deoxyribofuranosyl]-3-methylcytosine,
1-[5'-O-bis(p-methoxyphenyl)phenylmethyl-β-D-deoxyribofuranosyl]5-methyluracil,
9-(5'-O-triphenylmethyl-β-D-ribofuranosyl)7-deazaadenine,
1-(5'-O-triphenylmethyl-β-D-deoxyribofuranosyl)5-hydroxmethylcytosine,
9-(5'-O-triphenylmethyl-β-D-ribofuranosyl)-7-deazaphypoxanthine,
1-(5'-O-triphenylmethyl-β-D-ribofuranosyl)6-azauracil,
9-(5'-O-triphenylmethyl-β-D-ribofuranosyl)2,6-diaminopurine,
1-(5'-O-triphenylmethyl-β-D-arabinofuranosyl)5-hydroxymethylcytosine,
9-(5'-O-triphenylmethyl-β-D-deoxyribofuranosyl)6-mercapto-7-deazapurine and the like.

PREPARATION 21

$N^4$-benzoyl-1(2',3'-di-O-benzoyl-β-D-arabinofuranosyl)cytosine

A mixture of 6.2 g. of 1 - (5' - O - triphenylmethyl-β - D - arabino - furanosyl)cytosine, 40 ml. of dry pyridine, and 6 ml. of benzoyl chloride was stirred at room temperature (24–26° C.) for about 20 hours. The thus-obtained reaction mixture was then poured into 500 ml. of cold water and stirred at room temperature for 3 hours. The aqueous portion was then decanted and the residual gummy material was washed twice with water by decantation. The gum and solids were dissolved in 150 ml. of methylene chloride and this solution was extracted consecutively twice with 50-ml. portions of water and once with 50 ml. of a saturated aqueous sodium chloride solution. The methylene solution was then dried by passing it through 10 g. of anhydrous sodium sulfate, supported on a sintered glass funnel. The drying agent was then washed with 20 ml. of methylene chloride and the washing combined with the filtrate. The methylene chloride solution was thereupon evaporated at 40° in vacuo. The thus-obtained residue was dissolved in 50 ml. of chloroform and treated with stirring with 6.7 ml. of hydrogen bromide in acetic acid solution (30% hydrogen bromide). After 3 minutes, the reaction mixture was distilled to a volume of about 10 ml. at 40° in vacuo, to give a concentrate. This concentrate was diluted with 10 ml. of ordinary chloroform and added to a chromatographic column made up with 100 g. of silica gel (180 ml. volume). The silica gel employed was Brinkman silicic acid for chromatography employing hydrocarbon stabilized chloroform. The column was thereupon eluted with 3 column volumes (540 ml.) of ethanol stabilized chloroform at a flow rate of about 3.5 ml. per minute. The effluent from this procedure was discarded. The column was thereupon eluted with 1.2 l. of ethanol stabilized with chloroform to which 3% by volume of methanol had been added at a flow rate of 3.5 ml. per minute. The effluent from this operation was collected in 20 ml. fractions. Each fraction was examined for the presence of triphenylcarbinol or triphenylether by placing a drop of each fraction on a sheet of chromatographic paper (Watman No. 40) and examining the spot for ultraviolet absorption followed by spraying the paper with 50% aqueous sulfuric acid. Based on the result of this chromatographic determination, fractions 25–43 were combined, washed with 200 ml. of water containing 0.5 ml. of pyridine, dried with anhydrous sodium sulfate, and evaporated in vacuo to give a residue. This residue was recrystallized by dissolving it in ethyl acetate and adding Skellysolve B hexanes until crystallization started whereupon the vessel was refrigerated to 4° C. Three crops of crystals were collected which were all homogeneous as determined by thin layer chromatography using silicate gel, 10% methanol and 90% benzene. The total yield in three crops was 1.45 g., 0.940 g. and 0.740 g., a total of 3.13 g. (44%) of $N^4$ - benzoyl - 1 - (2',3' - di - O - benzoyl - β - D-arabinofuranosyl)cytosine of melting point 177.5 to 178° C.

*Analysis.*—Calcd. for $C_{30}H_{25}O_8$: C, 64.9; H, 4.5; N, 7.57. Found: C, 63.95; H, 4.67; N, 7.29.

PREPARATION 22

$N^4$-acetyl-1-(2',3'-di-O-acetyl-5'-O-triphenylmethyl-β-D-arabinofuranosyl)cytosine A suspension of 750 mg. of 1-(5'-O-triphenylmethyl-β-D-arabinofuranosyl)cytosine in 9 ml. of pyridine was treated with 3 ml. of acetic anhydride with stirring until a uniform solution was obtained. Stirring was then continued for 2 hours whereupon the solution became a crystalline mass. This material was transferred into 90 ml. of water yielding a white crystalline material which was collected by filtration, the solids were washed thoroughly with water, and dried giving 950 mg. of crystals of melting point 249–259.5° C. This material was recrystallized from ethanol giving 800 mg. colorless rosettes of $N^4$-acetyl - 1 - (2',3' - di - O - acetyl - 5' - O - triphenylmethyl - β - D - arabinofuranosyl)cytosine of melting point 251–252° C.

Analysis.—Calcd. for $C_{34}H_{33}O_7N_3$: C, 66.76; H, 5.44; N, 6.87. Found: C, 67.04; H, 5.47; N, 7.00.

PREPARATION 23

$N^4$-(β-cyclopentylpropionyl)-1-[2',3'-di-O-(β-cyclopentylpropionyl)-β-D-arabinofuranosyl]cytosine In the manner given in Preparation 21,1-(5-O-triphenylmethyl - β - D - arabinofuranosyl)cytosine was reacted with β-cyclopentylpropionyl chloride in pyridine and subsequently treated with hydrogen bromide, dissolved in acetic acid, to give $N^4$-(β-cyclopentylpropionyl)-1[2',3'-di - O - (β - cyclopentylpropionyl)β-d-arabinofuranosyl]cytosine.

PREPARATION 24

$N^4$-lauroyl-1-(2',3'-di-O-lauroyl-β-D-arabinofuranosyl)cytosine

In the manner given in Preparation 21, 1-(5'-O-triphenylmethyl-β-D-arabinofuranosyl)cytosine was reacted with lauroyl chloride in pyridine and subsequently treated with hydrogen bromide, dissolved in acetic acid, to give $N^4$ - lauroyl - 1(2',3' - di - O - lauroyl - β - D - arabinofuranosyl)cytosine.

PREPARATION 25

$N^4$-propionyl-1-(2',3'-di-O-propionyl-5'-triphenylmethyl-β-D-arabinofuranosyl)cytosine In the manner given in Preparation 22, 1,(5'-O-triphenylmethyl - β - D - arabinofuranosyl)cytosine was reacted with propionic anhydride in pyridine to give $N^4$-propionyl - 1 (2',3' - di - O - propionyl - 5' - triphenylmethyl - β - D - arabinofuranosyl)cytosine.

PREPARATION 26

$N^4$-butyryl-9-(2',3'-di-O-butyryl-5'-O-triphenylmethyl-β-D-arabinofuranosyl)adenine In the manner given in Preparation 22, 9 - (5' - O-triphenylmethyl - β - D - arabinofuranosyl)adenine was reacted with butyric anhydride in pyridine to give $N^6$-butyryl - 9 - (2',3' - di - O - butyryl - 5' - O - triphenylmethyl - β - D - arabinofuranosyl)adenine.

PREPARATION 27

1-(2',3'-di-O-phenylacetyl-5'-O-triphenylmethyl-β-D-arabinofuranosyl)thymine

In the manner given in Preparation 22, 1-(5'-O-triphenylmethyl-β-D-arabinofuranosyl)thymine was reacted with phenylacetic anhydride in pyridine to give 1,(2',3'-di- O - diphenylacetyl - 5' - O - triphenylmethyl - β - D-arabinofuranosyl)thymine.

PREPARATION 28

1-(2',3'-di-O-hexanoyl-5'-O-triphenylmethyl-β-D-arabinofuronsoyl)uracil

In the manner given in Preparation 22, 1-(5'-O-triphenylmethyl - β-D - arabinofuransoyl)uracil was reacted with hexanoic anhydride in pyridine to give 1-(2',3'-di-O-hexanol - 5' - O-triphenylmethyl-β-D-arabinofuranosyl) uracil.

PREPARATION 29

9-(2',3'-di-O-phenylpropionyl-5'-O-triphenylmethyl-β-D-arabinofuranosyl)xanthine In the manner given in Preparation 22, 9-(5'-O-triphenylmethyl-β-D-arabinofuransoyl)xanthine was reacted with phenylpriopionic anhydride in pyridine to give 9-(2',3'-di-O-phenylpropionyl - 5' - O - triphenylmethyl-β-D-arabinofuranosyl)xanthine.

PREPARATION 30

1-(2',3'-di-O-benzoyl-β-arabinofuranosyl)5-chlorouracil

In the manner given in Preparation 21, 1-(5',-O-triphenylmethyl - β-D-arabinofuranosyl)5-chlorouracil was reacted with benzoyl chloride and the resulting product was then reacted with a solution of hydrogen bromide in acetic acid to give 1-(2',3'-di-O-benzoyl-β-D-arabinofuranosyl)5-chlorouracil.

PREPARATION 31

$N^2$-benzoyl-9-(2',3'-di-O-benzoyl-β-D-arabinofuranosyl)guanine

In the manner given in Preparation 21, 9-(5'-O-triphenylmethyl-β-D-arabinofuranosyl)guanine was reacted with benzoyl chloride and the resulting product was then reacted with a solution of hydrogen bromide in acetic acid to give $N^2$-benzoyl-9-(2',3'-di-O-benzoyl-β-D-arabinofuranosyl)guanine.

PREPARATION 32

9-(2',3'-di-O-benzoyl-β-D-arabinofuranosyl)6-mercaptopurine

In the manner given in Preparation 21, 9-(5'-O-triphenylmethyl - β - D - arabinofuranosyl)6-mercaptopurine was reacted with benzoyl chloride and the resulting product was then reacted with a solution of hydrogen bromide in acetic acid to give 9-(2',3'-di-O-benzoyl-β-D-arabinofuranosyl)6-mercaptopurine.

PREPARATION 33

9-(2',3'-di-O-acetyl-5'-triphenylmethyl-β-D-arabinofuranosyl)xanthine

In the manner given in Preparation 22, 9-(-5'-O-triphenylmethyl - β-D-arabinofuranosyl)uracil was reacted with acetic anhydride to give 9-(2',3'-di-O-acetyl-5'-O-triphenylmethyl-β-D-arabinofuranosyl)xanthine.

PREPARATION 34

1-(2',3'-di-O-phenylacetyl-5'-O-triphenylmethyl-β-D-arabinofuranosyl)5-fluorouracil In the manner given in Preparation 22, 1-(5'-O-triphenylmethyl - β-D-arabinofuranosyl)5-fluorouracil was reacted with phenylacetic anhydride to give 1-(2',3'-di-O - phenylacetyl - 5'-O-triphenylmethyl-β-D-arabinofuranosyl)5-fluorouracil.

PREPARATION 35

$N^4$-valeryl-9-(2',3'-di-O-valeryl-5'-O-triphenylmethyl-β-D-arabinofuranosyl)5-methylcytosine In the manner given in Preparation 22, 9-(5'-O-triphenylmethyl - β - D-arabinofuranosyl)5-methylcytosine was reacted with valeric anhydride to give $N^4$-valeryl-9-(2'3' - di - O-valeryl-5'-O-triphenylmethyl-β-D-arabinofuranosyl)5-methylcytosine.

PREPARATION 36

1-(2',3'-di-O-benzoyl-β-D-ribofuranosyl)uracil

In the manner given in Preparation 21, 1-(5'-O-triphenylmethyl-β-D-ribofuranosyl)uracil was reacted with benzoyl chloride and the resulting product was then reacted with a solution of hydrogen bromide in acetic acid to give 1-(2',3'-di-O-benzoyl-β-D-ribofuranosyl)uracil.

PREPARATION 37

$N^4$-benzoyl-1-(2',3'-di-O-benzoyl-β-D-ribofuranosyl)cytosine

In the manner given in Preparation 21, 1-(5'-O-triphenylmethyl - β - D-ribofuranosylcytosine was reacted with benzoyl chloride and the resulting product was then reacted with a solution of hydrogen bromide in acetic acid to give $N^4$-benzoyl-1-(2',3'-di-O-benzoyl-β-D-ribofuranosyl)cytosine.

PREPARATION 38

1-(2',-3'-di-O-benzoyl-β-D-ribofuranosyl)thymine

In the manner given in Preparation 21, 1-(5'-O-triphenylmethyl - β - D-ribofuranosyl)thymine was reacted with benzoyl chloride and the resulting product was then reacted with a solution of hydrogen bromide in acetic acid to give 1-(2',3'-di-O-benzoyl-β-D-ribofuranosyl) thymine.

PREPARATION 39

1-(2',3'-di-O-lauroyl-β-D-ribofuranosyl)5-fluorouracil

In the manner given in Preparation 21, 1-(5'-O-triphenylmethyl - β-D-ribofuranosyl)5-fluorouracil was reacted with lauroyl chloride and the resulting product was then reacted with a solution of hydrogen bromide in acetic acid to give 1-(2',3'-di-O-lauroyl-β-D-ribofuranosyl)-5-fluorouracil.

PREPARATION 40

$N^6$-decanoyl-9-(2',3'-di-O-decanoyl-β-D-ribofuranosyl)adenine

In the manner given in Preparation 21, 9-(5'-O-triphenylmethyl-β-D-ribofuranosyl)adenine was reacted with decanoyl chloride and the resulting product was then reacted with a solution of hydrogen bromide in acetic acid to give $N^6$ - decanoyl-9-(2',3'-di-O-decanoyl-β-D-ribofuranosyl)adenine.

PREPARATION 41

9-(2',3'-di-O-octanoyl-β-D-ribofuranosyl)6-mercaptopurine

In the manner given in Preparation 21, 9-(5'-O-triphenylmethyl - β-D-ribofuranosyl)6-mercaptopurine was reacted with octanoyl chloride and the resulting product was then reacted with a solution of hydrogen bromide in acetic acid to give 9-(2',3'-di-O-octanoyl-β-D-ribofuranosyl)6-mercaptopurine.

PREPARATION 42

1-(3'-O-benzoyl-β-D-deoxyribofuranosyl)uracil

In the manner given in Preparation 21, 1-(5'-O-triphenylmethyl-β-D-deoxyribofuranosyl)uracil was reacted with benzoyl chloride and the resulting product was then reacted with a solution of hydrogen bromide in acetic acid to give 1-(3'-O-benzoyl-β-D-deoxyribofuranosyl) uracil.

PREPARATION 43

$N^4$-benzoyl-1-(3'-O-benzoyl-β-D-deoxyribofuranosyl)cytosine

In the manner given in Preparation 21, 1-(5'-O-triphenylmethyl - β-D-deoxyribofuranosyl)cytosine was reacted with benzoyl chloride and the resulting product was then reacted with a solution of hydrogen bromide in acetic acid to give $N^4$-benzoyl-1-(3'-O-benzoyl-β-D-deoxyribofuranosyl)cytosine.

PREPARATION 44

1-(3'-O-benzoyl-β-D-deoxyribofuranosyl)5-fluorouracil

In the manner given in Preparation 21, 1-(5'-O-triphenylmethyl - β - D - deoxyribofuranosyl)5-fluorouracil was reacted with benzoyl chloride and the resulting product was then reacted with a solution of hydrogen bromide in acetic acid to give 1-(3'-O-benzoyl-β-D-deoxyribofuranosyl)5-fluorouracil.

PREPARATION 45

$N^4$-acetyl-1-(3'-O-acetyl-β-D-deoxyribofuranosyl)5-methylcytosine

In the manner given in Preparation 21, 1-(5'-O-triphenylmethyl - β-D-deoxyribofuranosyl)5-methylcytosine was reacted with benzoyl chloride and the resulting product was then reacted with a solution of hydrogen bromide in acetic acid to give $N^4$-acetyl-1-(3'-O-acetyl-β-D-deoxyribofuranosyl)5-methylcytosine.

PREPARATION 46

9-(3'-O-benzoyl-β-D-deoxyribofuranosyl)6-mercaptopurine

In the manner given in Preparation 21, 9-(5'-O-triphenylmethyl - β - D-deoxyribofuranosyl)6 - mercaptopurine was reacted with benzoyl chloride and the resulting product was then reacted with a solution of hydrogen bromide in acetic acid to give 9-(3'-O-benzoyl-β-D-deoxyribofuranosyl)6-mercaptopurine.

PREPARATION 47

1-(2',3'-di-O-acetyl-5'-O-triphenylmethyl-β-D-ribofuranosyl)uracil

In the manner given in Preparation 22, 1-(5'-O-triphenylmethyl-β-D-ribofuranosyl)uracil was reacted with acetic anhydride to give 1-(2',3'-di-O-acetyl-5'-O-triphenylmethyl-β-D-ribofuranosyl)uracil.

PREPARATION 48

1-(2',3'-di-O-acetyl-5'-O-triphenylmethyl-β-D-ribofuranosyl)5-fluorouracil

In the manner given in Preparation 22, 1-(5'-O-triphenylmethyl-O-D-ribofuranosyl)5-fluorouracil was reacted with acetic anhydride to give 1-(2',3'-di-O-acetyl-5'-O-triphenylmethyl-β-D-ribofuranosyl)-5-fluorouracil.

PREPARATION 49

9-(2',3'-di-O-propionyl-5'-O-triphenylmethyl-β-D-ribofuranosyl)6-mercaptopurine In the manner given in Preparation 22, 9-(5'-O-triphenylmethyl-β-D-ribofuranosyl)6 - mercaptopurine was reacted with acetic anhydride to give 9-(2',3'-di-O-propionyl - 5' - O - triphenylmethyl - β-D - ribofuranosyl)6-mercaptopurine.

In the manner given in Preparation 21, other acyl compounds of Formula X can be produced by reacting a compound of Formula VIII with an acid anhydride, acyl chloride or acyl bromide wherein the acyl groups are of a hydrocarbon carboxylic acid containing from 2 to 12 carbon atoms, inclusive, and anisic acid, and cleaving the 5'-ether group with hydrogen halide, particularly hydrogen bromide or iodide. Compounds thus obtained include:

$N^4$-lauroyl-9-(2',3'-di-O-lauroyl-β-D-arabinofuranosyl) adenine,
9-(2',3'-di-O-valeryl-β-D-ribofuranosyl)hypoxanthine,
9-(2',3'-di-O-hexanoyl-β-D-ribofuranosyl)xanthine,
3-(2',3'-di-O-octanoyl-βD-ribofuranosyl)3-uracil,
9-(2',3'-di-O-isobutyryl-β-D-ribofuranosyl)5-fluorouracil,
1-(2'3'-di-O-anisoyl-β-D-ribofuranosyl)thymine,
$N^4$-phenylacetyl-1-(2'3'-di-O-phenylacetyl-β-D-ribofuranosyl)3-methylcytosine, 1-(3'-O-butyryl-β-D-deoxyribofuranosyl)5-iodouracil,
1-(3'-O-undecanoyl-β-D-deoxyribofuranosyl)5-trifluoromethyluracil,
1-(3'-O-decanoyl-β-D-deoxyribofuranosyl)5-bromouracil,
9-(3'-O-heptanoyl-β-D-deoxyribofuranosyl)guanine,
9-(3'-O-nonanoyl-β-D-deoxyribofuranosyl)6-mercaptopurine,
9-(3'-O-octanoyl-β-D-deoxyribofuranosyl)xanthine,
and the like.

PREPARATION 50

1-(3'-O-propionyl-5'-O-triphenylmethyl-β-D-deoxyribofuranosyl)uracil

In the manner given in Preparation 22, 1-(5'-O-triphenylmethyl-β-D-deoxyribofuranosyl)uracil was reacted with propionic anhydride to give 1-(3'-O-propionyl-5'-O-triphenylmethyl-β-D-deoxyribofuranosyl)uracil.

PREPARATION 51

1-(3'-O-butyryl-5'-O-triphenylmethyl-β-D-deoxyribofuranosyl)5-fluorouracil

In the manner given in Preparation 22, 1-(5'-O-triphenylmethyl-β-D-deoxyribofuranosyl)5-fluorouracil was reacted with butyric anhydride to give 1-(3'-O-butyryl-5'-O - triphenylmethyl - β - D - deoxyribofuranosyl)5-fluorouracil.

PREPARATION 52

$N^4$ - acetyl - 1 - (2',3'-di-O-acetyl-β-D-arabinofuranosyl)cytosine and 1-(2',3'-di-O-acetyl-β-D-arabinofuranosyl)cytosine A suspension of 10 ml. of 80% aqueous acetic acid and 1.3 g. of $N^4$-acetyl-1-(2',3'-di-O-acetyl-5'-O-triphenylmethyl-β-D-arabinofuranosyl)cytosine was heated to reflux for 10 minutes. The suspension was then refrigerated, filtered free of triphenylcarbinol and evaporated in vacuo at a temperature between 30–40° C. The product was taken up with 20 ml. of methanol and poured on a column containing a volume of 200 ml. of silica gel. The column was then eluted with thirty 20-ml. fractions consisting of methanol (25%), benzene (75%). Fractions 5–11 were combined and recrystallized from acetone-Skellysolve B hexanes to give 240 mg. melting at 171–172.5° C. This product was recrystallized to give $N^4$-acetyl - 1 - (2',3'-di-O-acetyl-β-D-arabinofuranosyl)cytosine of melting point 174.5–175.5° C. and the following analysis:

Analysis.—Calcd. for $C_{15}H_{19}O_8N_3$: C, 48.78; H, 5.19; N, 11.38. Found: C, 48.79; H, 4.81; N, 11.66.

Fractions 26 to 29 contained a small amount of 1-(2',3'-di-O-acetyl-β-D-arabinofuranosyl)cytosine.

In the manner given in Preparation 22, other acylated and 5'-etherated compounds of Formula IX can be prepared by reacting a compound of Formula VIII with an acylating reagent selected from acyl halide and acid anhydrides, wherein the acyl group is of a hydrocarbon carboxylic acid containing from 1 to 12 carbon atoms, inclusive, and anisic acid. Representative compounds thus obtained include:

1-(2',3'-di-O-heptanoyl-5'-O-triphenylmethyl-β-D-ribofuranosyl)5-iodouracil,
$N^4$-phenylacetyl-1-(2',3'-di-O-phenylacetyl-5'-O-triphenylmethyl-β-D-arabinofuranosyl)cytosine,
$N^4$-hexanoyl-1-(2',3'-di-O-hexanoyl-5'-O-triphenylmethyl-β-D-arabinofuranosyl)cytosine,
$N^4$-phenylpropionyl-1-(2',3'-di-O-phenylpropionyl-5'-O-triphenylmethyl-β-D-arabinofuranosyl)cytosine,
$N^4$-butyryl-1-(2',3'-di-O-butyryl-5'-O-triphenylmethyl-β-D-arabinofuranosyl)cytosine,
$N^4$-valeryl-1-(2',3'-di-O-valeryl-5'-O-triphenylmethyl-β-D-arabinofuranosyl)cytosine,
$N^4$-hexanoyl-1-(2',3'-di-O-hexanoyl-5'-O-triphenylmethyl-β-D-arabinofuranosyl)cytosine,
$N^4$-heptanoyl-1-(2',3'-di-O-heptanoyl-5'-O-triphenylmethyl-β-D-arabinofuranosyl)cytosine,
$N^4$-octanoyl-1-(2',3'-di-O-octanoyl-5'-O-triphenylmethyl-β-D-arabinofuranosyl)cytosine,
$N^4$-acetyl-1-[2',3'-di-O-acetyl-5'-O-(p-methoxyphenyl)diphenylmethyl-β-D-arabinofuranosyl]cytosine,
$N^4$-acetyl-1-[2',3'-di-O-acetyl-5'-O-bis(p-methoxyphenyl)phenylmethyl-β-D-arabinofuranosyl]cytosine,
$N^4$phenylpropionyl-1-[2',3'-di-O-phenylpropionyl-5'-O-(p-methoxyphenyl)diphenylmethyl-β-D-arabinofuranosyl]cytosine,
$N^4$-valeryl-1-[2',3'-di-O-valeryl-5'-O-triphenylmethyl-β-D-ribofuranosyl]cytosine,
1-(2',3'-di-O-hexanoyl-5'-O-triphenylmethyl-β-D-arabinofuranosyl)uracil,
9-(3'-O-heptanoyl-5'-O-triphenylmethyl-β-D-deoxyribofuranosyl)xanthine,
1-(2',3'-di-O-octanoyl-5'-O-triphenylmethyl-β-D-arabinofuranosyl)guanine,
$N^6$-acetyl-1-[3'-O-acetyl-5'-O-(p-methoxyphenyl)diphenylmethyl-β-D-deoxyribofuranosyl]adenine,
$N^4$-acetyl-1-[3'-O-acetyl-5'-O-bis(p-methoxyphenyl)phenylmethyl-β-D-deoxyribofuranosyl)3-methylcytosine,
1-[2',3'-di-O-phenylpropionyl-5'-O-(p-methoxyphenyl)diphenylmethyl-β-D-ribofuranosyl)5-chlorouracil,
$N^4$-valeryl-1-[2',3'-di-O-valeryl-5'-O-(p-methylphenyl)diphenylmethyl-β-D-arabinofuranosyl]3-methylcytosine,
$N^4$-hexanoyl-1-(2',3'-di-O-hexanoyl-5'-O-triphenylmethyl-β-D-ribofuranosyl)5-methylcytosine,
9-(3'-O-heptanoyl-5'-O-triphenylmethyl-β-D-deoxyribofuranosyl)hypoxanthine,
1-(2',3'-di-O-octanoyl-5'-O-triphenylmethyl-β-D-arabinofuranosyl)5'-trifluoromethyluracil,
$N^2$-acetyl-9-[2',3'-di-O-acetyl-5'-O-(p-methoxyphenyl)diphenylmethyl-β-D-ribofuranosyl]guanine,
$N^6$-acetyl-[2',3'-di-O-acetyl-5'-O-bis(p-methoxyphenyl)phenylmethyl-β-D-arabinofuranosyl]adenine,
$N^4$-anisoyl-1-[3'-O-anisoyl-5'-O-(p-methoxyphenyl)diphenyl-β-D-deoxyribofuranosyl)5-methylcytosine,
and the like.

PREPARATION 53

$N^4$-butyryl-1-(2',3'-di-O-butyryl-β-D-arabinofuranosyl)cytosine

In the manner given in Preparation 52, $N^4$-butyryl-1-(2',3'-di-O-butyryl-5'-O-triphenylmethyl - β - D-arabinofuranosyl)cytosine is heated with aqueous acetic acid to give $N^4$-butyryl-1-(2',3'-di-O-butyryl-β-D - arabinofuranosyl)cytosine.

PREPARATION 54

$N^4$-phenylacetyl-1-(2',3'-di-O-phenylacetyl-β-D-arabinofuranosyl)cytosine

In the manner given in Preparation 52, $N^4$-phenylacetyl-1-(2',3'-di-O-phenylacetyl-5'-O - triphenylmethyl - β - D-arabinofuranosyl)cytosine is heated with aqueous acetic acid to give $N^4$-phenylacetyl-1-(2',3'-di-O-phenylacetyl-β-D-arabinofuranosyl)cytosine.

PREPARATION 55

$N^4$hexanoyl-1-(2',3',di-O-hexanoyl-β-D-arabinofuranosyl)cytosine

In the manner given in Preparation 52, $N^4$-hexanoyl-1-(2',3'-di-O-hexanoyl-5'-O-triphenylmethyl-β-D - arabinofuranosyl)cytosine is heated with aqueous acetic acid to give $N^4$-hexanoyl-1-(2',3'-di-O-hexanoyl - β - D-arabinofuranosyl)cytosine.

PREPARATION 56

$N^4$-phenylpropionyl-1-(2',3'-di-O-phenylpropionyl-β-D-arabinofuranosyl)cytosine In the manner given in Preparation 52, $N^4$-phenylpropionyl-1(2',3'-di-O - phenylpropionyl - 5'-O-triphenylmethyl - β - D-arabinofuranosyl)cytosine is heated with aqueous acetic acid to give N$^4$-phenylpropionyl-1-(2',3'-di-O-phenylpropionyl-β-D-arabinofuranosyl)cytosine.

In the same manner given in Preparation 52, other acylated nucleosides are obtained by heating the corresponding acylated and etherified nucleoside with aqueous acetic acid. Representative compounds thus obtained include:

N$^4$-valeryl-1-(2',3'-di-O-valeryl-β-D-arabinofuranosyl)cytosine,
N$^2$-hexanoyl-1-(2',3'-di-O-hexanoyl-1-(2',3'-di-O-hexanoyl-β-D-arabinofuranosyl)guanine,
N$^6$-heptanoyl-1-(2',3'-di-O-heptanoyl-β-D-arabinofuranosyl)adenine,
N$^4$-octanoyl-1-(2',3'-di-O-octanyl-β-D-arabinofuranosyl)3-methylcytosine,
N$^4$-benzoyl-1-(2',3'-di-O-benzoyl-β-D-arabinofuranosyl)cytosine,
N$^6$-anisoyl-9-(2',3'-di-O-anisoyl-β-D-arabinofuranosyl)adenine,
9-(2',3'-di-O-lauroyl-β-D-ribofuranosyl)xanthine,
N$^4$-octanoyl-1-(2',3'-di-O-octanoyl-β-D-arabinofuranosyl)3-methylcytosine,
N$^2$-decanoyl-9-(2',3'-di-O-decanoyl-β-D-arabinofuranosyl)guanine,
N$^4$-butyryl-1-(2',3'-di-O-butyryl-β-D-arabinofuranosyl)5-methylcytosine,
9-(2',3'-di-O-phenylpropionyl-β-D-ribofuranosyl)6-mercaptopurine,
N$^4$-propionyl-1-(2',3'-di-O-propionyl-β-D-arabinofuranosyl)5-methylcytosine,
1-[2',3'-di-O-(β-cyclopentylpropionyl)-β-D-ribofuranosyl]5-iodouracil,
1-(2',3'-di-O-anisoyl-β-D-ribofuranosyl)-5-fluorouracil,
1-(3'-O-valeryl-β-D-deoxyribofuranosyl)uracil,
1-(2',3'-di-O-benzoyl-β-D-ribofuranosyl)5-trifluoromethyluracil,
1-(3'-O-hexanoyl-β-D-deoxyribofuranosyl)thymine, and the like.

PREPARATION 57

1-β-D-arabinofuranosylcytosine 5'-phosphate

To a solution of 40 ml. of pyridine, 0.325 M in 2-cyanoethyl phosphate was added 2.5 g. of N$^4$-acetyl-1-(2',3' - di - O - acetyl - β - D - arabinofuranosyl)cytosine containing a small amount of 1-(2',3'-di-O-acetyl-β-D-arabinofuranosyl)cytosine. To this solution was added an additional 20 ml. of pyridine containing 5.6 g. of dicyclohexylcarbodiimide. The reaction was shaken in the dark for 2 days after time 10 ml. of water was added and the solution warmed up to 40° C. The reaction mixture was shaken for one hour after which time an additional 75 ml. of water was added and the solution was filtered free of insoluble dicyclohexylurea. The filtrate was taken to dryness, diluted with 50 ml. of water and again evaporated to remove residual pyridine. The thus-obtained residue was then partitioned between water and ether, 150 ml. (1:1) and the aqueous portion freed of ether in vacuo after a second extraction. The remaining aqueous solution (90 ml.) was then treated with 2.16 g. (90 mmoles) of lithium hydroxide and the solution heated to 100° C. for a period of 1 hour. Thereafter the suspension was chilled and filtered free of lithium phosphate. The solids were washed with 0.01 N lithium hydroxide solution which was added to the filtrate. The filtrate was then adjusted to pH of 7 by addition of an acid exchange resin (Dowex 50(H+)). The mixture was thereupon filtered again and the resin-free solution was distilled to a volume of 25 ml. at 40° C. and under reduced pressure. The solution was then passed over 75 ml. of fresh Dowex-50 resin. The resin was eluted with water until the pH of the eluate was in the range of 4–5. The pH of the resulting solution was adjusted to 7.5 by the addition of concentrated ammonia hydroxide. The product-containing solution, about 200 ml., was absorbed into a column charged with Dowex AG–1 (formate) resin (125 ml.) and the column was eluted with 125 ml. of water. Thereafter, the column was eluted with 0.02 M formic acid solution and the eluate collected in 20 ml. fractions at a flow rate of 2 ml. per minute. After a 200 ml. forerun which was discarded, fractions 13–33 were combined and lyophilized to give a white crystalline solid weighing 250 mg. This material when twice recrystallized from water at 4° gave fine needles of 1-β-D-arabinofuranosylcytosine 5'-phosphate having the following analysis:

Analysis.—Calcd. for $C_9H_{14}O_8N_3P$: C, 33.44; H, 4.37; N, 13.00; P, 9.58. Found: C, 33.37; H, 4.88; N, 12.61; P, 9.75.

PREPARATION 58

N$^4$-benzoyl-1-β-D-arabinofuranosylcytosine 5'-phosphate

A solution was prepared containing 50 mmoles of pyridinium-2-cyanoethylphosphate, dissolved in 10 ml. of dry pyridine, and thereto was added 2.77 g. of N$^4$-benzoyl-1-(2',3'-di-O-benzoyl - β - D-arabinofuranosyl)cytosine, whereupon the solution was taken to dryness. The mixture was then dissolved in 25 ml. of pyridine, 3.09 (150 mmoles) of dicyclohexylcarbodiimide was added and the mixture shaken at room temperature for 5½ days. About 15 ml. of water was then added and the mixture extracted twice with Skellysolve B hexanes and filtered free of the insoluble urea compound. The solution was then diluted to 40 ml. with pyridine, chilled to about 0° with ice and made about 1 N in sodium hydroxide by the addition of 40 ml. of ice cold 2 N sodium hydroxide solution. The reaction was terminated after 20 minutes by adding an excess of pyridinium-Dowex 50X8 resin. The resin was separated by filtration, washed with water and the aqueous washings and filtrate were evaporated under reduced pressure to about 25 ml. following the addition of 200 mg. of ammonium bicarbonate. The precipitates in the 25 ml. of solution were removed by filtration. The filtrate was evaporated under reduced pressure and the residue taken up in a solvent system composed of 1 M ammonium acetate (pH 6) and isopropyl alcohol in a 2:5 ratio, then absorbed onto a cellulose column having a column volume of 1850 ml. made up with the same system. The column was then eluted with a solvent mixture consisting of one molar aqueous ammonium acetate solution and isopropyl alcohol (2:5), the first 600 ml. of eluate was discarded. Then, fractions of 20 ml. each were collected (325 fractions total). Fractions 55–110, when combined, contained approximately 90% of theory of the total amount of N$^4$-benzoyl-1-β-D-arabinofuranosylcytosine 5'-phosphate. These fractions were evaporated to a small volume in the presence of 10 ml. of pyridine, the residue was diluted with water to a volume of 50 ml. and the product absorbed on a column charged with pyridinium-Dowex 50 W x 8. The column was then eluted with 3 l. of deionized water. The total effluent was concentrated under reduced pressure and rediluted with 1% aqueous pyridine four times, followed by concentration. Finally, the residue was taken up in dilute aqueous pyridine and lyophilized twice from this solvent to give a white solid of N$^4$-benzoyl-1-β-D-arabinofuranosylcytosine 5'-phosphate in a yield of 1.81 g. (70%).

Analysis.—Calcd. for $C_{16}H_{18}N_3O_8P \cdot H_2O \cdot$ Pyridine: P, 5.95. Found: P, 6.06. Heating this solvate to 100° C. in vacuo (15 mm. Hg) for 72 hours gave N$^4$-benzoyl-1-β-D-arabinofuranosylcytosine 5'-phosphate.

In the same manner given in Preparation 57, other N-acyl - 1 - (2',3'-di-O-acyl-β-D-arabinofuranosyl)cytosines can be phosphorylated, losing the acyl groups in positions 2', 3' and the acyl group connected to the amino group of the cytosine; e.g.:

PREPARATION 59

*1-β-D-arabinofuranosylcytosine 5'-phosphate*

In the manner given in Preparation 57, treating N⁴-(β-cyclopentylpropionyl) - 1 - [2',3'-di-O-(β-cyclopentylpropionyl)-β-D-arabinofuranosyl]cytosine with 2-cyanoethylphosphate, then dicyclohexylcarbodiimide, and thereafter with lithium hydroxide at the reflux temperature of the reaction mixture, gave 1-β-D-arabinofuranosylcytosine 5'-phosphate.

PREPARATION 60

*1-β-D-arabinofuranosylcytosine 5'-phosphate*

In the manner given in Preparation 57, treating N⁴-lauroyl - 1-(2',3'-di-O-lauroyl-β-D-arabinofuranosyl)cytosine with 2-cyanoethylphosphate, then dicyclohexylcarbodiimide and finally lithium hydroxide at the reflux temperature of the reaction mixture gave 1-β-D-arabinofuranosylcytosine 5'-phosphate.

Following the procedure of Preparation 57,

N⁴-decanoyl-1-(2',3'-di-O-decanoyl-β-D-arabinofuranosyl)cytosine,
N⁴-propionyl-1-(2',3'-di-O-propionyl-β-D-arabinofuranosyl)cytosine,
1-(2',3'-di-O-butyryl-β-D-arabinofuranosyl)uracil,
N⁴-phenylacetyl-1-(2',3'-di-O-phenylacetyl-β-D-arabinofuranosyl)cytosine,
N⁴-hexanoyl-1-(2',3'-di-O-hexanoyl-β-D-arabinofuranosyl)cytosine,
N⁴-phenylpropionyl-1-(2',3'-di-O-phenylpropionyl-β-D-arabinofuranosyl cytosine,
N⁶-anisoyl-1-(2',3'-di-O-anisoyl-β-D-arabinofuranosyl adenine,
N⁴-octanoyl-1-(2',3'-di-O-octanoyl-β-D-arabinofuranosyl)3-methylcytosine,
N⁴-butyryl-1-(2',3'-di-O-butyryl-β-D-arabinofuranosyl)5-methylcytosine,
N²-anisoyl-1-(2',3'-di-O-anisoyl-β-D-arabinofuranosyl)guanine,
9-(2',3'-di-O-lauroyl-β-D-ribofuranosyl)xanthine,
N⁴-octanoyl-1-(2',3'-di-O-octanoyl-β-D-arabinofuranosyl)3-methylcytosine,
1-(2',3'-di-O-decanoyl-β-D-ribofuranosyl)thymine,
N⁴-butyryl-1-(2',3'-di-O-butyryl-β-D-arabinofuranosyl)5-hydroxymethylcytosine,
9-(2',3'-di-O-phenylacetyl-β-D-arabinofuranosyl)6-mercaptopurine,
N⁴-propionyl-1-(2',3'-di-O-propionyl-β-D-arabinofuranosyl)5-methylcytosine,
1-[2',3'-di-O-(β-cyclopentylpropionyl)-β-D-ribofuranosyl]5-iodouracil,
1-(2',3'-di-O-anisoyl-β-D-ribofuranosyl)5-fluorouracil,
1-(3'-O-valeryl-β-D-deoxyribofuranosyl)uracil,
1-(2',3'-di-O-benzoyl-β-D-ribofuranosyl)5-trifluoromethyluracil,
1-(3'-O-hexanoyl-β-D-deoxyribofuranosyl)thymine, can be converted to the corresponding unacylated 5'-phosphate, substituted arabinofuranosyl, -ribofuranosyl or -deoxyribofuranosyl products. Representative compounds obtained in this manner include:

1-β-D-arabinofuranosyladenine 5'-phosphate,
1-β-D-arabinofuranosyl-5-methylcytosine 5'-phosphate,
1-β-D-arabinofuranosyluracil 5'-phosphate,
9-β-D-arabinofuranosylxanthine 5'-phosphate,
9-β-D-arabinofuranosylhypoxanthine 5'-phosphate,
1-β-D-arabinofuranosylthymine 5'-phosphate,
9-β-D-arabinofuranosyl-6-mercaptopurine 5'-phosphate,
1-β-D-arabinofuranosyl-5-fluorouracil 5'-phosphate,
1-β-D-arabinofuranosyl-5-chlorouracil 5'-phosphate,
1-β-D-arabinofuranosyl-5-bromouracil 5'-phosphate,
1-β-D-arabinofuranosyl-5-iodouracil 5'-phosphate,
1-β-D-arabinofuranosyl-5-trifluoromethyluracil 5'-phosphate,
1-β-D-ribofuranosyl-5-fluorouracil 5'-phosphate,
1-β-D-ribofuranosyl-5-trifluoromethyluracil 5'-phosphate,
9-β-D-ribofuranosylxanthine, 5'-phosphate,
9-β-D-ribofuranosylguanine 5'-phosphate,
1-β-D-ribofuranosyluracil-5'-phosphate,
1-β-D-ribofuranosylcytosine 5'-phosphate,
1-β-D-ribofuranosylthymine 5'-phosphate,
9-β-D-ribofuranosyladenine 5'-phosphate,
9-β-D-ribofuranosylxanthine 5'-phosphate,
9-β-D-ribofuranosyl-6-mercaptopurine 5'-phosphate,
1-β-D-ribofuranosyl 5-iodouracil 5'-phosphate,
1-β-D-deoxyribofuranosyluracil 5'-phosphate,
1-β-D-deoxyribofuranosylthymine 5'-phosphate,
9-β-D-deoxyribofuranosylhypoxanthine 5'-phosphate,
9-β-D-deoxyribofuranosylthymine 5'-phosphate,
9-β-D-deoxyribofuranosyl-2'6'-diaminopurine 5'-phosphate,
1-β-D-ribofuranosyl-6-azauracil 5'-phosphate,
9-β-D-ribofuranosyl-7-deazahypoxanthine 5'-phosphate,
9-β-D-deoxyribofuranosyl-6-mercapto-7-deazapurine 5'-phosphate,
9-β-D-deoxyribofuranosyladenine 5'-phosphate,
1-β-D-deoxyribofuranosylcytosine 5'-phosphate,
9-β-D-deoxyribofuranosylguanine 5'-phosphate,
1-β-D-deoxyribofuranosyl-5-fluorouracil 5'-phosphate,
9-β-D-deoxyribofuranosylxanthine 5'-phosphate and the like.

PREPARATION 61

*N⁴-benzoyl-1-(2',3'-di-O-acetyl-β-D-arabinofuranosyl)cytosine 5'-phosphate*

A solution of N⁴-benzoyl-1-β-D-arabinofuranosylcytosine 5'-phosphate (Example 69) was suspended in a mixture of 15 ml. pyridine, 15 ml. acetic anhydride. This mixture was stirred for about 18 hours at room temperature. The solution was then diluted with 15 ml. of water and stirred for 3 hours at room temperature. The solvent was then removed at 30° under high vacuum and the residue triturated with ether. A gummy material remained which was freed from ether in vacuo, then dissolved in dry pyridine and the solution stored at 4°. The solid which separated by this procedure, when collected on a filter, represented pure N⁴-benzoyl-1-(2',3'-di-O-acetyl-β-D-arabinofuranosyl)cytosine 5'-phosphate.

PREPARATION 62

*N⁴-benzoyl-1-(2',3'-di-O-propionyl-β-D-arabinofuranosyl)cytosine 5'-phosphate*

In the manner given in Preparation 61, treating N⁴-benzoyl-1-β-D-arabinofuranosylcytosine 5'-phosphate with propionic anhydride in pyridine gives N⁴-benzoyl-1-(2',3'-di-O-propionyl - β-D-arabinofuranosyl)cytosine 5'-phosphate.

PREPARATION 63

*N⁴-benzoyl-1-(2',3'-di-O-butyryl-β-D-arabinofuranosyl)cytosine 5'-phosphate*

In the manner given in Preparation 61, treating N⁴-benzoyl-β-D-arabinofuranosylcytosine 5'-phosphate with butyric anhydride in pyridine gives N⁴-benzoyl-1-(2',3'-di-O-butyryl-β-D-arabinofuranosyl)cytosine 5'-phosphate.

PREPARATION 64

*N⁴-benzoyl-1-(2',3'-di-O-benzoyl-β-D-arabinofuranosyl)cytosine 5'-phosphate*

In the manner given in Preparation 61, treating N⁴-benzoyl-1-β-D-arabinofuranosylcytosine 5'-phosphate with benzoic anhydride in pyridine gives N⁴-benzoyl-1-(2',3'-di-O-benzoyl-β-D-arabinofuranosyl)cytosine 5'-phosphate.

PREPARATION 65

*N⁴-benzoyl-1-(2',3'-di-O-phenylacetyl-β-D-arabinofuranosyl)cytosine 5'-phosphate*

In the manner given in Preparation 61, treating N⁴-benzoyl-1-β-D-arabinofuranosylcytosine 5'-phosphate with phenylacetic anhydride in pyridine gives N⁴-benzoyl-1-(2',3'-di-O-phenylacetyl-β - D - arabinofuranosyl)cytosine 5'-phosphate.

PREPARATION 66

*N⁴-anisoyl-1-(2',3'-di-O-valeryl-β-D-arabinofuranosyl)cytosine 5'-phosphate*

In the manner given in Preparation 61, treating N⁴-anisoyl-1-β-D-arabinofuranosylcytosine 5'-phosphate with valeric anhydride in pyridine gives N⁴-anisoyl-1-(2',3'-di-O-valeryl-β-D-arabinofuranosyl)cytosine 5'-phosphate.

PREPARATION 67

*N⁴-acetyl-1-(2',3'-di-O-acetyl-β-D-arabinofuranosyl)cytosine 5'-phosphate*

In the manner given in Preparation 61, 1-β-D-arabinofuranosylcytosine 5'-phosphate was reacted with excess acetic anhydride and tetraethyl ammonium acetate in pyridine to give N⁴-acetyl-1-(2',3'-di-O-acetyl-β-D-arabinofuranosyl)cytosine 5'-phosphate.

PREPARATION 68

*N⁴-propionyl-1-(2',3'-di-O-propionyl-β-D-arabinofuranosyl)cytosine 5'-phosphate*

In the manner given in Preparation 61, 1-β-D-arabinofuranosylcytosine 5'-phosphate was reacted with excess propionic anhydride in pyridine to give N⁴-propionyl-1-(2',3'-di-O-propionyl-β-D - arabinofuranosyl)cytosine 5'-phosphate.

PREPARATION 69

*N⁶-phenylpropionyl-9-(2',3'-di-O-phenylpropionyl-β-D-arabinofuranosyl)adenine 5'-phosphate*

In the manner given in Preparation 61, 1-β-D-arabinofuranosyladenine 5'-phosphate was reacted with excess phenylpropionic anhydride in pyridine to give N⁶-phenylpropionyl-1-(2',3'-di-O-phenylpropionyl - β - D - arabinofuranosyl)adenine 5'-phosphate.

PREPARATION 70

*1-(2',3'-di-O-benzoyl-β-D-arabinofuranosyl)uracil 5'-phosphate*

In the manner given in Preparation 61, 1-β-D-arabinofuranosyluracil 5'-phosphate was reacted with excess benzoic anhydride in pyridine to give 1-(2',3'-di-O-benzoyl-β-D-arabinofuranosyl))uracil 5'-phosphate.

PREPARATION 71

*9-(2',3'-di-O-hexanoyl-β-D-arabinofuranosyl)xanthine 5'-phosphate*

In the manner given in Preparation 61, 1-β-D-arabinofuranosylxanthine 5'-phosphate was reacted with excess hexanoic anhydride in pyridine to give 9-(2',3'-di-O-hexanoyl-β-D-arabinofuranosyl)xanthine 5'-phosphate.

PREPARATION 72

*9-[2',3'-di-O-(β-cyclopentylpropionyl)-β-D-arabinofuranosyl]6-mercaptopurine 5'-phosphate*

In the manner given in Preparation 61, 1-β-D-arabinofuranosyl-6-mercaptopurine 5'-phosphate was reacted with excess β-cyclopentylpropionyl chloride in pyridine to give 9-[2',3'-di-O-(β-cyclopentylpropionyl)-β-D-arabinofuranosyl]6-mercaptopurine 5'-phosphate.

PREPARATION 73

*N²-lauroyl-9-(2',3'-di-O-lauroyl-β-D-arabinofuranosyl)guanine 5'-phosphate*

In the manner given in Preparation 61, 9-β-D-arabinofuranosylguanine 5'-phosphate was reacted with excess lauroyl chloride in pyridine to give N²-lauroyl-9-(2',3'-di-O-lauroyl-β-D-arabinofuranosyl)guanine 5'-phosphate.

PREPARATION 74

*1-(2',3'-di-O-decanoyl-β-D-arabinofuranosyl)thymine 5'-phosphate*

In the manner given in Preparation 61, 1-β-D-arabinofuranosylthymine 5'-phosphate was reacted with excess decanoyl chloride in pyridine to give 1-(2',3'-di-O-decanoyl-β-D-arabinofuranosyl)thymine 5'-phosphate.

PREPARATION 75

*N⁴-benzoyl-1-(2',3'-di-O-propionyl-β-D-ribofuranosyl)cytosine 5'-phosphate*

In the manner given in Preparation 61, treating N⁴-benzoyl-1-β-D-ribofuranosylcytosine 5'-phosphate with propionic anhydride in pyridine gives N⁴-benzoyl-1-(2',3'-di-O-propionyl-β-D-ribofuranosyl)cytosine 5'-phosphate.

PREPARATION 76

*N⁴-benzoyl-1-(2',3'-di-O-butyryl-β-D-ribofuranosyl)cytosine 5'-phosphate*

In the manner given in Preparation 61, treating N⁴-benzoyl-1-β-D-ribofuranosylcytosine 5'-phosphate with butyric anhydride in pyridine gives N⁴-benzoyl-1-(2',3'-di-O-butyryl-β-D-ribofuranosyl)cytosine 5'-phosphate.

PREPARATION 77

*N⁴-benzoyl-1-(2',3'-di-O-benzoyl-β-D-ribofuranosyl)cytosine 5'-phosphate*

In the manner given in Preparation 61, treating N⁴-benzoyl-1-β-D-ribofuranosylcytosine 5'-phosphate with benzoic anhydride in pyridine gives N⁴-benzoyl-1-(2',3'-di-O-benzoyl-β-D-ribofuranosyl)cytosine 5'-phosphate.

PREPARATION 78

*N⁶-benzoyl-9-(2',3'-di-O-propionyl-β-D-ribofuranosyl)adenine 5'-phosphate*

In the manner given in Preparation 61, treating N⁶-benzoyl-9-β-D-ribofuranosyladenine 5'-phosphate with propionic anhydride in pyridine gives N⁶-benzoyl-9-(2',3'-di-O-propionyl-β-D-ribofuranosyl)adenine 5'-phosphate.

PREPARATION 79

*1-(2',3'-di-O-butyryl-β-D-ribofuranosyl)uracil 5'-phosphate*

In the manner given in Preparation 61, treating 1-β-D-ribofuranosyluracil 5'-phosphate with butyric anhydride in pyridine gives 1-(2',3'-di-O-butyryl-β-D-ribofuranosyl)uracil 5'-phosphate.

PREPARATION 80

*9-(2',3'-di-O-benzoyl-β-D-ribofuranosyl)6-mercaptopurine 5'-phosphate*

In the manner given in Preparation 61, treating 9-β-D-ribofuranosyl-6-mercaptopurine 5'-phosphate with benzoic anhydride in pyridine gives 9-(2',3'-di-O-benzoyl-β-D-ribofuranosyl)6-mercaptopurine 5'-phosphate.

PREPARATION 81

*1-(2',3'-di-O-phenylpropionyl-β-D-ribofuranosyl)-5-fluorouracil 5'-phosphate*

In the manner given in Preparation 61, treating 1-β-D-ribofuranosyl-5-fluorouracil 5'-phosphate with phenylpropionic anhydride in pyridine gives 1-(2',3'-di-O-phenylpropionyl-β-D-ribofuranosyl)5-fluorouracil 5'-phosphate.

PREPARATION 82

*N²-acetyl-1-(2',3'-di-O-octanoyl-β-D-ribofuranosyl) guanine 5'-phosphate*

In the manner given in Preparation 61, treating N²-acetyl-1-β-D-ribofuranosylguanine 5'-phosphate with octanoic anhydride in pyridine gives N²-acetyl-1-(2',3'-di-O-octanoyl-β-D-ribofuranosyl)guanine 5'-phosphate.

PREPARATION 83

*1-(2',3'-di-O-benzoyl-β-D-ribofuranosyl)thymine 5'-phosphate*

In the manner given in Preparation 61, treating 1-β-D-ribofuranosylthymine 5'-phosphate with benzoic anhydride in pyridine gives 1-(2',3'-di-O-benzoyl-β-D-ribofuranosyl)thymine 5'-phosphate.

PREPARATION 84

*N⁴-benzoyl-1-(3'-O-propionyl-β-D-deoxyribofuranosyl) cytosine 5'-phosphate*

In the manner given in Preparation 61, treating N⁴-benzoyl-1-β-D-deoxyribofuranosylcytosine 5'-phosphate with propionic anhydride in pyridine gives N⁴-benzoyl-1-(3'-O-propionyl-β-D-deoxyribofuranosyl)cytosine 5'-phosphate.

PREPARATION 85

*N⁴-benzoyl-1-(3'-O-butyryl-β-D-deoxyribofuranosyl) cytosine 5'-phosphate*

In the manner given in Preparation 61, treating N⁴-benzoyl-1-β-D-deoxyribofuranosylcytosine 5'-phosphate with butyric anhydride in pyridine gives N⁴-benzoyl-1-(3'-O-butyryl-β-D-deoxyribofuranosyl)cytosine 5'-phosphate.

PREPARATION 86

*N⁴-benzoyl-1-(3'-O-benzoyl-β-D-deoxyribofuranosyl)-cytosine 5'-phosphate*

In the manner given in Preparation 61, treating N⁴-benzoyl-1-β-D-deoxyribofuranosylcytosine 5'-phosphate with benzoic anhydride in pyridine gives N⁴-benzoyl-1-(3'-O-benzoyl-β-D-deoxyribofuranosyl)cytosine 5'-phosphate.

PREPARATION 87

*N⁶-benzoyl-9-(3'-O-propionyl-β-D-deoxyribofuranosyl)-adenine 5'-phosphate*

In the manner given in Preparation 61, treating N⁶-benzoyl-9-β-D-deoxyribofuranosyladenine 5'-phosphate with propionic anhydride in pyridine gives N⁶-benzoyl-1-(3'-O-propionyl-β-D-deoxyribofuranosyl)adenine 5'-phosphate.

PREPARATION 88

*N²-phenylacetyl-1-(3'-O-butyryl-β-D-deoxyribofuranosyl)guanine 5'-phosphate*

In the manner given in Preparation 61, treating N²-phenylacetyl-1-β-D-deoxyribofuranosylguanine 5'-phosphate with butyric anhydride in pyridine gives N²-phenylacetyl-1-(3'-O-butyryl-β-D-deoxyribofuranosyl)guanine 5'-phosphate.

PREPARATION 89

*1-(3'-O-benzoyl-β-D-deoxyribofuranosyl)uracil 5'-phosphate*

In the manner given in Preparation 61, treating 1-β-D-deoxyribofuranosyluracil 5'-phosphate with benzoic anhydride in pyridine gives 1-(3'-O-benzoyl-β-D-deoxyribofuranosyl)uracil 5'-phosphate.

PREPARATION 90

*9-(3'-O-valeryl-β-D-deoxyribofuranosyl)hypoxanthine 5'-phosphate*

In the manner given in Preparation 61, treating 9-β-D-deoxyribofuranosylhypoxanthine 5'-phosphate with valeric anhydride in pyridine gives 9-(3'-O-valeryl-β-D-deoxyribofuranosyl)hypoxanthine 5'-phosphate.

PREPARATION 91

*N⁴-propionyl-1-(3'-O-butyryl-β-D-deoxyribofuranosyl)-3-methylcytosine 5'-phosphate*

In the manner given in Preparation 61, treating N⁴-propionyl-1-β-D-deoxyribofuranosyl-3-methylcytosine 5'-phosphate with butyric anhydride in pyridine gives N⁴-propionyl-1-(3'-O-butyryl-β-D-deoxyribofuranosyl)3-methylcytosine 5'-phosphate.

PREPARATION 92

*1-(3'-O-lauroyl-β-D-deoxyribofuranosyl)5'-trifluoromethyluracil 5'-phosphate*

In the manner given in Preparation 61, treating 1-β-D-deoxyribofuranosyl-5'-trifluoromethyluracil 5'-phosphate with lauroyl chloride in pyridine gives 1-(3'-O-lauroyl-β-D-deoxyribofuranosyl)5'-trifluoromethyluracil 5'-phosphate.

PREPARATION 93

*1-(3'-O-hexanoyl-β-D-deoxyribofuranosyl)thymine 5'-phosphate*

In the manner given in Preparation 61, treating 1-β-D-deoxyribofuranosylthymine 5'-phosphate with hexanoyl anhydride in pyridine gives 1-(3'-O-hexanoyl-β-D-deoxyribofuranosyl)thymine 5'-phosphate.

PREPARATION 94

*9-(3'-O-anisoyl-β-D-deoxyribofuranosyl)6-mercaptopurine 5'-phosphate*

In the manner given in Preparation 61, treating 9-β-D-deoxyribofuranosyl-6-mercaptopurine 5'-phosphate with anisoyl chloride in pyridine gives 9-(3'-O-anisoyl-β-D-deoxyribofuranosyl)6-mercaptopurine 5'-phosphate,

EXAMPLE 10

*N⁶ - benzoyl-9-[5'-O-(p-methoxyphenyl)diphenylmethyl-β-D-ribofuranosyl]-7-deazaadenin-2'-yl 1-(3'-O-acetyl-β-D-deoxyribofuranosyl)thymin-5'-yl phosphate and N⁶ - benzoyl - 9 - [5' - O-(p-methoxyphenyl)diphenylmethyl-β-D-ribofuranosyl)-7-deazaadenin-3'-yl 1-(3'-O-acetyl-β-D-methoxyribofuranosyl)thymin-5'-yl phosphate; and 9-β-D-ribofuranosyl-7-deazaadenine-2'-yl 1-β-D-deoxyribofuranosylthymin-5'-yl phosphate and 9-β-D-ribofuranosyl-7-deazaadenin-3'-yl 1-β-D-desoxyribofuranosylthymin-5'-yl phosphate*

A solution of 920 mg. (2-millimoles) of N6-benzoyl-9-(5' - O-(p-methoxyphenyl)diphenylmethyl-β-D-ribofuranosyl)-7-deazaadenine and 1.29 g. (2 millimoles) of 1-(3'-O-acetyl-β-D-deoxyribofuranosyl)thymine 5'-phosphate, prepared according to Khorana, in 70 ml. of dry pyridine (T. M. Jacob and H. G. Khorana, J. Am. Chem. Soc., 86, 1630 (1964)) in a 100 ml. round flask, equipped with an addition funnel protected from moisture, was concentrated under reduced pressure in a bath at 40° until the material was completely dry. To this material dry pyridine was added through the addition funnel without opening the system to air and the concentration was repeated. This procedure was repeated a third time. To the reaction mixture was added 20 ml. of dry pyridine under dry nitrogen. The system was brought to atmospheric pressure with dry air. To the thus-obtained solution was added 2.06 g. (10 millimoles) of N,N'-dicyclohexylcarbodiimide and the mixture was shaken in the dark, at room temperature, for a period of 3 days. Thereafter, there was added 10 ml. of water and the aqueous suspension was stirred for 23 hours. This suspension was then filtered to remove N,N'-dicyclohexylurea, the filtrate was washed with water and concentrated under high vacuum at a bath temperature of 38° C. to given a syrupy type of material. The syrupy material was mixed with water and the thus-obtained solution extracted with petroleum ether. The aqueous layer was therefore lyophilized to yield 2.2 g. of a mixture containing $N^6$-benzoyl - 9-[5'-O-(p-methoxyphenyl)diphenylmethyl-β-D-ribofuranosyl]-7-deazaadenin-2'-yl 1-(3'-O-acetyl-β-D-deoxyribofuranosyl)-thymin-5'-yl phosphate and $N^6$-benzoyl-9-[5'-O-(p-methoxyphenyl)diphenylmethyl-β-D-ribofuranosyl)-7-deazaadenin-3'-yl 1-(3'-O-acetyl-β-D-deoxyribofuranosyl)thymin-5'-yl phosphate.

1 g. of this material was chromatographed using a gradient solution of methanol and Skellysolve B hexanes which separated the two oligonucleotides, $N^6$-benzoyl-9-[5' - O-(p-methoxyphenyl)diphenylmethyl-β-D-ribofuranosyl)7 - deazaadenin-2'-yl 1-(3'-O-acetyl-β-D-desoxyribofuranosyl)thymin-5'-yl phosphate and $N^6$-benzoyl-9[5'-O-(p - methoxyphenyl)diphenylmethyl-β-D-ribofuransoyl]7-deazaadenin - 3' - yl 1-(3'-O-acetyl-β-D-deoxyribofuranosyl)-thymin-5'-yl phosphate, from each other.

Another portion of 1.1 g. of the above lyophilized solid was dissolved in 8 ml. of water, and thereto was added 5 ml. of methanol and 16 ml. of concentrated ammonium hydroxide. The mixture was stirred overnight at a temperature between 22 and 24° C. The mixture was then concentrated to dryness at a high vacuum with a bath temperature of 35° C. To the dried material 15 ml. of 80% aqueous acetic acid was added and the resulting solution was allowed to stand at room temperature (about 24° C.) for a period of 18 hours. Thereafter the reaction mixture was heated to 30° C. in a high vacuum to remove excess acetic acid. The resulting residue was dissolved in 20 ml. of water, the solution was adjusted to a pH of 8 with 3 N aqueous ammonium hydroxide and extracted twice with 20 ml. of ether. The ether extracts were discarded and the aqueous layer was concentrated to about half the volume to remove the dissolved ether. Thereafter the solution was diluted to a total volume of 25 ml. in a volumetric flask. Ultraviolet measurements showed 17,000 optical density units (O.D.U.). at 269–270 mμ.

This solution was thereupon chromatographed on a DEAE-cellulose column (diethylaminoethyl-cellulose) in the carbonate form using gradient elution from 3 l. of 0.02 N to 3 l. of 0.125 N triethylammonium bircarbonate following the elution of 16 ml. fractions on a Vanguard analyzer at 270 mμ. Fractions 51–72 and 87–103 were combined, after thin-layer and papergram chromatography indicated the two fractions to be identical. They were further purified by thin layer chromatography on an 8" x 20" plate coated with cellulose for thin layer chromatography using a [CAMAG–DF] solvent system consisting of one part concentrated ammonium hydroxide, 2 parts water and 7 parts isopropyl alcohol (System A). The band corresponding to the product was scraped off the plate, eluted with water and the solution lyophilized to give 230 mg. of solid material having $R_f$ 0.47 (System A) and $$\lambda_{max.}^{EtOH} 270 \text{ m}\mu \text{ (} \epsilon \text{ 9400)}$$

Sixty mg. of this material were chromatographed over a Dowex 1 x 2 formate column, collecting 20 ml. of fractions of a gradient elution of from 2.0 l. of 0.03 N sodium formate to 2.0 l. of 0.08 N sodium formate. Elution was then continued with 0.08 N sodium formate. Fractions 84–114 were combined, lyophilized, and run over a Dowex 50W X 8 (H+ form) column, and the resulting eluate was immediately lyophilized. Fractions 220–264 were similarly combined and desalted (inorganic phosphates were present). The combined fractions 84–114 constituted 9-β-D-ribofuranosyl-7-deazaadenin-2'-yl 1-β-D-deoxyribofuranosylthymin-5'-yl phosphate which was proven by the fact that the 2', 5' phosphodiester could not be split by spleen phosphodiesterase at various enzyme concentrations. Fractions 220–264 were completely split by spleen phosphodiesterase and represented therefore 9-β-D-ribofuranosyl-7-deazaadenin-3'-yl 1β-D-deoxyribofuranosylthymin-5'-yl phosphate.

Another separation was carried out with 170 mg. from the original 230 mg. of material resulting from the preparative thin-layer chromatography. These 170 mg. were dissolved in water, the pH was adjusted to 7.5 and the solution chromatographed on a diethylaminoethyl-cellulose column (carbonated form), taking 5 ml. fractions and eluting gradiently, using 2 l. each of 0.08 N and 0.125 N triethylammonium bicarbonate at a flow rate of 1 ml. per 3 min. Fractions 25–35 were combined, lyophilized, redissolved twice in water and lyophilized to give a product which was 9-β-D-ribofuranosyl-7-deazaadenin-2'-yl 1 - β-D - deoxyribofuranosylthymin-5'-yl phosphate of optical density unit 1300 at 270 mμ and $R_f$ 0.56 in a solvent system of one part ammonium hydroxide, 2 parts of water and 7 parts isopropyl alcohol. Fractions 42–58 constituted 9-β-D-ribofuranosyl-7-deazaadenin - 3' - yl 1-β-D-deoxyribofuranosylthymin-5'-yl phosphate of optical density unit 1050 at 270 mμ; $R_f$ 0.57 in the same solvent system.

EXAMPLE 11

9-(5'-O-triphenylmethyl - β - D - ribofuranosyl)-7-deazapurin-2'-yl $N^4$-benzoyl-1-(2',3'-di - O - benzoyl - β - D-arabinofuranosyl)cytosin-5'-yl phosphate and 9-(5'-O-triphenylmethyl - β - D-ribofuranosyl)-7-deazapurin-3'-yl $N^4$-benzoyl-1-(2',3'-di-O-benzoyl-β - D - arabinofuranosyl)cytosin-5'-yl phosphate; 9-β-D-ribofuranosyl-7-deazapurin-2'-yl 1 - β-D-arabinofuranosylcytosin-5'-yl phosphate and 9-β-D-ribofuranosyl-7-deazapurin-3'-yl 1-β-D-arabinofuranosylcytosin-5'-yl phosphate In the manner given in Example 10, 9-(5'-O-triphenylmethyl-β-D-ribofuranosyl)-7-deazapurine is reacted with $N^4$-benzoyl 1-(2',3'-di-O - benzoyl-β-D-arabinofuranosyl) cytosin-5'-phosphate in the presence of N,N'-dicyclohexylcarbodiimide to give 9-(5'-O-tri-phenylmethyl-β-D-ribofuranosyl)-7-deazapurin-2'-yl $N^4$-benzoyl-1-(2',3'-di-O-benzoyl-β-D - arabinofuranosyl)cytosin-5'-yl phosphate and 9-(5'-O - triphenylmethyl - β - D - ribofuranosyl)-7-deazapurin-3'-yl $N^4$-benzoyl - 1 - (2',3'-di-O-benzoyl-β-D-arabinofuranosyl)cytosin-5'-yl phosphate.

Hydrolyses of the above mixture as in Example 10, first with ammonium hydroxide in aqueous methanol, then with aqueous acetic acid gave a mixture of 9-β-D-ribofuranosyl-7-deazapurin-2'-yl 1-β-D-arabinofuranosylcytosin-5'-yl phosphate and 9β-D-ribofuranosylcytosin-7-deazapurin-3'-yl 1 - β - D - arabinofuranosylcytosin-5'-yl phosphate, which are separated by chromatography.

EXAMPLE 12

$N^6$-benzoyl-9-(5'-O - triphenylmethyl-β-D-ribofuranosyl) 7 - deazaadenin-2'-yl $N^4$-benzoyl-1-(2',3'-di-O-benzoyl-β-D-arabinofuranosyl)cytosin-5'-yl phosphate and $N^6$-benzoyl-9-(5'-O-triphenylmethyl-β - D - ribofuranosyl) 7-deazaadenin-3'-yl $N^4$-benzoyl-1-(2',3' - di-O-benzoyl-β-D - arabinofuranosyl)cytosin-5-yl phosphate; 9-β-D-ribofuranosyl-7-deazaadenin-2'-yl 1 - β - D - arabinofuranosylcytosin-5'-yl phosphate and 9-β-D-ribofuranosyl-7-deazaadenin-3'-yl 1 - β-D-arabinofuranosylcytosin-5'-yl phosphate In the manner given in Example 10, $N^6$-benzoyl-9-(5'-O-triphenylmethyl-β-D - ribofuranosyl)-7-deazaadenin is reacted with $N^4$-benzoyl - 1 - (2',3' - di - O-benzoyl-β-D-arabinofuranosyl)cytosine 5'-phosphate in the presence of N,N'-dicyclohexylcarbodiimide to give $N^6$-benzoyl-9-(5' - O - triphenylmethyl-β-D-ribofuranosyl)-7-deazadenin-2'-yl $N^4$-benzoyl-1-(2',3'-di-O - benzoyl-β-D-arabinofuranosyl)cytosin-5'-yl phosphate and $N^6$-benzoyl-9-(5'-O-triphenylmethyl - β - D-ribofuranosyl)-7-deazaadenin-3'-yl $N^4$-benzoyl-1-(2',3'-di-O-benzoyl-β - D - arabinofuranosyl)cytosin-5'-yl phosphate.

Hydrolysing the above mixture as in Example 10, first with ammonium hydroxide in aqueous methanol, then with aqueous acetic acid gave a mixture of 9-β-D-ribofuranosyl - 7 - deazaadenin-2'-yl 1-β-D-arabinofuranosylcytosin-5'-yl phosphate and 9-β-D-ribofuranosyl-7-deazaadenin-3'-yl 1-β - D - arabinofuranosylcytosin-5'-yl phosphate, which were separated by chromatography.

EXAMPLE 13

9-(5'-O-triphenylmethyl-β - D - ribofuranosyl)6-hydroxy-7-deazapurin-2'-yl $N^6$-benzoyl-9-(2',3'-di - O - benzoyl-β-D-ribofuranosyl)adenin-5'-yl phosphate and 9-(5'-O-triphenylmethyl-β - D - ribofuranosyl)6-hydroxy-7-deazapurin-3'-yl $N^6$-benzoyl-9-(2',3'-di - O - benzoyl-β-D-ribofuranosyl)adenin - 5' - yl phosphate; 9-β-D-ribofuranosyl-6-hydroxy-7-deazapurin-2'-yl 9 - β - D - ribofuranosyl-adenin-5'-yl phosphate and 9-β-D-ribofuranosyl-6-hydroxy-7-deazapurin-3'-yl 9-β-D-ribofuranosyl-adenin-5'-yl phosphate In the manner given in Example 10, 9-(5'-O-triphenylmethyl-β-D-ribofuranosyl) - 6 - hydroxy-7-deazapurine is reacted with $N^6$-benzoyl-9-(2', 3'-di-O-benzoyl-β-D-ribofuranosyladenin-5'-phosphate in the presence of N,N'-dicyclohexylcarbodiimide to give 9-(5'-O-triphenylmethyl - β - D-ribofuranosyl-6-hydroxy-7-deazapurin-2'-yl $N^6$-benzoyl-9 - (2',3'-di - O - benzoyl-β-D-ribofuranosyl)adenin-5'-yl phosphate and 9-(5'-O-triphenylmethyl-β-D-ribofuranosyl) - 6 - hydroxy-7-deazapurin-3'-yl $N^6$-benzoyl-9-(2',3'-di-O-benzoyl-β-D-ribofuranosyl)adenin - 5'-yl phosphate.

Hydrolysing the above mixture as in Example 10, first with ammonium hydroxide in aqueous methanol, then with aqueous acetic acid gave a mixture of 9-β-D-ribofuranosyl - 6 - hydroxy-7-deazapurin-2'-yl 9-β-D-ribofuranosyladenin-5'-yl phosphate and 9-β-D-ribofuranosyl-6-hydroxy-7-deazapurin-3'-yl 9-β-D-ribofuranosyladenin-5'-yl phosphate, which are separated by chromatography.

EXAMPLE 14

9 - (5' - O-triphenylmethyl-β-D-ribofuranosyl)6-mercapto-7-deazapurin-2'-yl 1-(3'-O-acetyl-β-D-deoxyribofuranosyl)uracil-5'-yl phosphate and 9(5' - O-triphenylmethyl-β-D-ribofuranosyl)-6-mercapto - 7 - deazapurin-3'-yl 1-(3'-O-acetyl - β - D-deoxyribofuranosyl)uracil-5'-yl phosphate; 9-β-D-ribofuranosyl - 6 - mercapto-7-deazapurin - 2' - yl 1-β-D-deoxyribofuranosyluracil-5'-yl phosphate and 9-β-D-ribofuranosyl-6-mercapto-7-deazapurin-3'-yl 1-β-D-deoxyribofuranosyluracil - 5'-yl phosphate In the manner given in Example 10, 9-(5'-O-triphenylmethyl-β-D-ribofuranosyl)-6-mercapto-7-deazapurin is reacted with 1-(3'-O-acetyl-β-D-deoxyribofuranosyl)uracil 5'-phosphate in the presence of N,N'-dicyclohexylcarbodiimide to give 9-(5'-O-triphenylmethyl-β-D-ribofuranosyl)6 - mercapto-7-deazapurin-2'-yl 1-(3'-O-acetyl-β-D-deoxyribofuranosyl)uracil-5'-yl phosphate and 9-(5'-O-triphenylmethyl-β-D - ribofuranosyl) - 6 - mercapto-7-deazapurin-3'-yl 1-(3'-O-acetyl-β - D - deoxyribofuranosyl)uracil-5'-yl phosphate.

Hydrolysing the above mixture as in Example 10, first with ammonium hydroxide in aqueous methanol, then with aqueous acetic acid gave a mixture of 9-β-D-ribofuranosyl - 6 - mercapto-7-deazapurin-2'-yl 1-β-D-deoxyribofuranosyluracil-5'-yl phosphate and 9-β-D-ribofuranosyl - 6 - mercapto-7-deazapurin-3'-yl 1-β-D-deoxyribofuranosyluracil-5'-yl phosphate, which are separated by chromatography.

EXAMPLE 15

$N^6$ - propionyl-9-(5'-O-triphenylmethyl-β - D - ribofuranosyl) - 7 - deazaadenin-2'yl 1-(2',3'-di-O-phenylacetyl-β-D-arabinofuranosyl)5-fluorouracil - 5' - yl phosphate and $N^6$-propionyl-9(5' - O - triphenylmethyl-β-D-ribofuranosyl)-7-deazaadenin-3'-yl 1-(2',3'-di - O-phenylacetyl - β - D - arabinofuranosyl)5 - fluorouracil-5'-yl phosphate; 9-β-D-ribofuranosyl - 7 - deazaadenin-2'-yl 1-β-D-arabinofuranosyl-5-fluorouracil-5'-yl phosphate and 9-β-D-ribofuranosyl - 7 - deazaadenin-3'-yl 1-β-D-arabinofuranosyl-5-fluorouracil-5'-yl phosphate In the manner given in Example 10, $N^6$-propionyl-9-(5' - O - triphenylmethyl - β - D - ribofuranosyl)7-deazaadenine is reacted with 1-(2',3'-di-O-phenylacetyl-β-D-arabinofuranosyl)5-fluorouracil 5'-phosphate in the presence of N,N'-dicyclohexylcarbodiimide to give $N^6$-propionyl-9-(5' - O - triphenylmethyl - β - D-ribofuranosyl)-7-deazaadenin-2'-yl 1-(2',3'-di-O-phenylacetyl-β-D-arabinofuranosyl)5-fluorouracil-5'-yl phosphate and $N^6$-propionyl-9-(5'-O-triphenylmethyl - β - D - ribofuranosyl)7-deazaadenin-3'-yl 1-(2',3'-di-O-phenylacetyl-β-D-arabinofuranosyl)5-fluorouracil-5'-yl phosphate.

Hydrolysing the aboxe mixture as in Example 10, first with ammonium hydroxide in aqueous methanol then with aqueous acetic acid gave a mixture of 9-β-D-ribofuranosyl-7-deazaadenin-2'-yl 1-β-D-arabinofuranosyl-5-fluorouracil-5'-yl phosphate and 9-β-D-ribofuranosyl-7-deazaadenin - 3'-yl 1-β-D-arabinofuranosyl-5-fluorouracil-5'-yl phosphate, which are separated by chromatography.

EXAMPLE 16

$N^6$-benzoyl-9-[5' - O - (p-methoxyphenyl)diphenylmethyl-β-D-ribofuranosyl] - 7-deazaadenin-2'-yl $N^4$-lauroyl-1-(3'-O-lauroyl - β - D - deoxyribofuranosyl)5 - methylcytosin-5'-yl phosphate and $N^6$-benzoyl-9-[5'-O-(p-methoxyphenyl)diphenylmethyl - β - D-ribofuranosyl]-7-deazaadenin-3'-yl $N^4$-lauroyl - 1 - (3'-O-lauroyl-β-D-deoxyribofuronosyl)5-methylcytosin-5'-yl phosphate; 9-β-D-ribofuranosyl-7-deazaadenin-2'-yl 1-β-D-deoxyribofuranosyl-5-methylcytosin-5'-yl phosphate and 9-β-D - ribofuranosyl-7-deazaadenine-3'-yl 1-β-D-deoxyribofuranosyl-5-methylcytosin-5'-yl phosphate In the manner given in Example 10, $N^6$-benzoyl-9-[5'-O-(p-methoxyphenyl)diphenylmethyl - β - D - ribofuranosyl]7-deazaadenine is reacted with $N^4$-lauroyl-1-(3'-O-lauroyl-β-D-deoxyribofuranosyl) - 5 - methylcytosine 5'-phosphate in the presence of N,N'-dicyclohexylcarbodiimide to give $N^6$-benzoyl-9-[5'-O-(p-methoxyphenyl)-diphenylmethyl-β-D-ribofuranosyl)-7-deazaadenin-2'-yl $N^4$-lauroyl - 1 - [3' - O - lauroyl-β-D-deoxyribofuranosyl]5-methylcytosin-5'-yl phosphate and $N^6$-benzoyl-9-[5'-O-(p-methoxyphenyl)diphenylmethyl - β - D-ribofuranosyl] 7 - deazaadenin-3'-yl $N^4$-lauroyl-1-(3'-O-lauroyl-β-D-deoxyribofuranosyl)5-methylcytosin-5'-yl phosphate.

Hydrolysing the above mixture as in Example 10, first with ammonium hydroxide in aqueous methanol, then with aqueous acetic acid gave a mixture of 9-β-D-ribofuranosyl-7-deazaadenin-2'-yl 1-β-D-deoxyribofuranosyl-5-methylcytosin-5'-yl phosphate and 9-β-D-ribofuranosyl-7-deazaadenin-3'-yl 1-β-D-deoxyribofuranosyl-5-methylcytosin-5'-yl phosphate, which are separated by chromatography.

In the same manner given in Example 10, other 9-β-D-ribofuranosyl-7-deazapurin-2'-yl and -3'-yl nucleoside-5'-yl phosphates can be produced by (1) the condensation of 9-β-D-ribofuranosyl-7-deazapurines, protected by acyl groups in the position which are not desired to react with the phosphoric acid moiety of the nucleoside-5'-yl phosphate (2) hydrolyses with base and acid to get the free dinucleoside 2', 5'- and 3',5'-phosphates.

Representative compounds thus obtained include:

9-β-D-ribofuranosyl-7-deazaadenin-2'-yl 9-β-D-arabinofuranosylguanin-5'-yl phosphate;

9-β-D-ribofuranosyl-7-deazaadenin-2'-yl 9-β-D-arabinofuranosylxanthin-5'-yl phosphate;

9-β-D-ribofuranosyl-7-deazaadenin-2'-yl 9-β-D-arabinofuranosylhypoxanthin-5'-yl phosphate;

9-β-D-ribofuranosyl-7-deazaadenin-2'-yl-9-β-D-arabinofuranosyl-7-deazapurin-5'-yl phosphate;

9-β-D-ribofuranosyl-7-deazaadenin-2'-yl 9-β-D-arabinofuranosyl-2,6-diaminopurin-5'-yl phosphate;
9-β-D-ribofuranosyl-7-deazaadenin-2'-yl 9-β-D-arabinofuranosyl-7-deazaadenin-5'-yl phosphate;
9-β-D-ribofuranosyl-7-deazaadenin-2'-yl 9-β-D-arabinofuranosyl-7-deazahypoxanthin-5'-yl phosphate;
9-β-D-ribofuranosyl-7-deazaadenin-3'-yl 9-β-D-arabinofuranosylguanin-5'-yl phosphate;
9-β-D-ribofuranosyl-7-deazaadenin-3'-yl 9-β-Darabinofuranosylxanthin-5'-yl phosphate;
9-β-D-ribofuranosyl-7-deazaadenin-3'-yl 9-β-D-arabinofuransylhypoxanthin-5'-yl phosphate;
9-β-D-ribofuranosyl-7-deazaadenin-3'-yl 9-β-D-arabinofuranosyl-7-deazapurin-5'-yl phosphate;
9-β-D-ribofuranosyl-7-deazaadenin-3'-yl 9-β-D-arabinofuranosyl-2,6-diaminopurin-5'-yl phosphate;
9-β-D-ribofuranosyl-7-deazaadenin-3'-yl 9-β-D-arabinofuranosyl-7-deazaadenin-5'-yl phosphate;
9-β-D-ribofuranosyl-7-deazaadenin-3'-yl 9-β-D-arabinofuranosyl-7-deazahypoxanthin-5'-yl phosphate;
9-β-D-ribofuranosyl-7-deazaadenin-2'-yl 1-β-D-arabinofuranosyl-5-chlorouracil-5'-yl phosphate;
9-β-D-ribofuranosyl-7-deazaadenin-2'-yl 1-β-D-arabinofuranosyl-5-iodouracil-5'-yl phosphate;
9-β-D-ribofuranosyl-7-deazaadenin-2'-yl 1-β-D-arabinofuranosyl-5-trifluoromethyluracil-5'-yl phosphate;
9-β-D-ribofuranosyl-7-deazaadenin-2'-yl 1-β-D-arabinofuransyl-3-methylcytosin-5'-yl phosphate;
9-β-D-ribofuranosyl-7-deazaadenin-3'-yl 1-β-D-arabinofuranosyl-5-chlorouracil-5'-yl phosphate;
9-β-D-ribofuranosyl-7-deazaadenin-3'-yl 1-β-D-arabinofuranosyl-5-iodouracil-5'-yl phosphate;
9-β-D-ribofuranosyl-7-deazaadenin-3'-yl 1-β-D-arabinofuranosyl-5-trifluoromethyluracil-5'-yl phosphate;
9-β-D-ribofuranosyl-7-deazaadenin-3'-yl 1-β-D-arabinofuranosyl-3-methylcytosin-5'-yl phosphate;
9-β-D-ribofuranosyl-7-deazapurin-2'-yl 9-β-D-ribofuranosyl-6-mercaptopurin-5'-yl phosphate;
9-β-D-ribofuranosyl-7-deazapurin-3'-yl 9-β-D-ribofuranosyl-6-mercaptopurin-5'-yl phosphate;
9-β-D-ribofuranosyl-6-hydroxy-7-deazapurin-2'-yl 9-β-D-deoxyribofuranosylguanin-5'-yl phosphate;
9-β-D-ribofuranosyl-6-hydroxy-7-deazapurin-3'-yl 9-β-D-deoxyribofuranosylguanin-5'-yl phosphate;
9-β-D-ribofuranosyl-6-hydroxy-7-deazapurin-2'-yl 9-β-D-deoxyribofuranosylhypoxanthine-5'-yl phosphate;
9-β-D-ribofuranosyl-6-hydroxy-7-deazapurin-3'-yl 9-β-D-deoxyribofuranosylhypoxanthine-5'-yl phosphate;
9-β-D-ribofuranosyl-6-mercapto-7-deazapurin-2'-yl 1-β-D-ribofuranosylcytosin-5'-yl phosphate;
9-β-D-ribofuranosyl-6-mercapto-7-deazapurin-3'-yl 1-β-D-ribofuranosylcytosin-5'-yl phosphate;
9-β-D-ribofuranosyl-6-mercapto-7-deazapurin-2'-yl 1-β-D-ribofuranosylthymin-5'-yl phosphate;
9-β-D-ribofuranosyl-6-mercapto-7-deazapurin-3'-yl 1-β-D-ribzofuranosylthymin-5'-yl phosphate;
9-β-D-ribofuranosyl-6-mercapto-7-deazapurin-2'-yl 9-β-D-ribonfuranosyladenin-5'-yl phosphate;
9-β-D-ribofuranosyl-6-mercapto-7-deazapurin-3'-yl 9-β-D-ribofuranosyladenin-5'-yl phosphate;
9-β-D-ribofuranosyl-6-butylmercapto-7-deazapurin-2'-yl 1-β-D-deoxyribofuranosyl-6-deazauracil-5'-yl phosphate;
9-β-D-ribofuranosyl-6-butylmercapto-7-deazapurin-3'-yl 1-β-D-deoxyribofuranosyl-6-deazauracil-5'-yl phosphate, and the like.

EXAMPLE 17

$N^6$-benzoyl-9-[5'-O-(p-methoxyphenyl)diphenylmethyl-β-D-ribofuranosyl]-7-deazaadenin-2'-yl 1-(2',3'-di-O-benzoyl-β-D-arabinofuranosyl)5-iodouracil-5'-yl phosphate and $N^6$-benzoyl-9-[5'-O-(p-methoxyphenyl)-diphenylmethyl-β-D-ribofuranosyl]-7-deazaadenin-3'-yl 1-(2',3'-di-O-benzoyl-β-D-arabinofuranosyl)5-iodouracil-5'-yl phosphate; $N^6$-benzoyl-9-β-D-ribofuranosyl-7-deazaadenin-2'-yl 1-β-D-arabinofuranosyl-5-iodouracil-5'-yl phosphate and $N^6$-benzoyl-9-β-D-ribofuranosyl-7-deazaadenin-3'-yl 1-β-D-arabinofuranosyl-5-iodouracil-5'-yl phosphate In the manner given in Example 10, $N^6$-benzoyl-9-[5'-O-(p-methoxyphenyl)diphenylmethyl-β-D-ribofuranosyl]7-deazaadenin is reacted with 1-(2',3'-di-O-benzoyl-β-D-arabinofuranosyl)5-iodouracil 5'-phosphate in the presence of N,N'-dicyclohexylcarbodiimide to give $N^6$-benzoyl-9-[5'-O-(p-methoxyphenyl)diphenylmethyl-β-ribofuranosyl]-7-deazaadenin-2'-yl 1-(2',3'-di-O-benzoyl-β-D-arabinofuranosyl)5-iodouracil-5'-yl phosphate and N-benzoyl-9-[5'-O-(p-methoxyphenyl)diphenylmethyl-β-D-ribofuranosyl]-7-deazaadenin-3'-yl 1-(2',3'-di-O-benzoyl-β-D-arabinofuranosyl)-5-iodouracil-5'-yl phosphate.

This mixture was treated for 30 minutes at 0° C. with 1 N aqueous barium hydroxide and then dropwise until neutral with rapid stirring with 1 N sulfuric acid. The solution was then allowed to stand overnight in the refrigerator at about 0° and was then filtered to remove the crystals of barium sulfate. The filtrate was evaporated to give a residue which was treated with 80% aqueous acetic acid for a period of 6 hours at room temperature. The acetic acid solution was evaporated in vacuo and the resulting products separated as shown in Example 10 to give: N-benzoyl-9-β-D-ribofuranosyl-7-deazaadenin-2'-yl 1-β-D-arabinofuranosyl-5-iodouracil-5'-yl phosphate and $N^6$-benzoyl-9-β-D-ribofuranosyl-7-deazaadenin-3'-yl 1-β-D-arabinofuranosyl-5-iodouracil-5'-yl phosphate.

EXAMPLE 18

$N^6$-propionyl-9-(5'-O-triphenylmethyl-β-D-ribofuranosyl)-7-deazaadenin-2'-yl $N^4$-benzoyl-1-(2',3'-di-O-benzoyl-β-D-arabinofuranosyl)cytosin-5'-yl phosphate and $N^6$-propionyl-9-(5'-O-triphenylmethyl-β-D-ribofuranosyl)-7-deazzadenin-3'-yl $N^4$-benzoyl-1-(2',3'-di-O-benzoyl-β-D-arabinofuranosyl)cytosin-5-yl phosphate; $N^6$-propionyl-9-β-D-ribofuranosyl-7-deazaadenin-2'-yl $N^4$-benzoyl-1-β-D-arabinofuranosylcytosin-5'-yl phosphate and $N^6$-propionyl-9-β-D-ribofuranosyl-7-deazaadenin-3'-yl $N^4$-benzoyl-1-β-D-arabinofuranosylcytosin-5'-yl phosphate In the manner given in Example 10, $N^6$-propionyl-9-(5'-O-triphenylmethyl-β-D-ribofuranosyl)7-deazaadenine is reacted with $N^4$-benzoyl-1-(2',3'-di-O-benzoyl-β-D-arabinofuranosyl)cytosine 5'-phosphate in the presence of N,N'-dicyclohexylcarbodiimide to give $N^6$-propionyl-9-(5'-O-triphenylmethyl-β-D-ribofuranosyl)-7-deazadenin-2'-yl $N^4$-benzoyl-1-(2',3'-di-O-benzoyl-β-D-arabinofuranosyl)cytosin-5'-yl phosphate and $N^6$-propionyl-9-(5'-O-triphenylmethyl-β-D-ribofuranosyl)7-deazaadenin-3'-yl $N^4$-benzoyl-1-(2',3'-di-O-benzoyl-β-D-arabinofuranosyl)cytosin-5'-yl phosphate.

This mixture was treated for 30 minutes at 0° C. with 1 N aqueous barium hydroxide and then dropwise until neutral with rapid stirring with 1 N sulfuric acid. The solution was then allowed to stand overnight in the refrigerator at about 0° and was then filtered to remove the crystals of barium sulfate. The filtrate was evaporated to give a residue which was treated with 80% aqueous acetic acid for a period of 6 hours at room temperature. The acetic acid solution was evaporated in vacuo and the resulting products separated as shown in Example 10 to give: $N^6$-propionyl-9-β-D-ribofuranosyl-7-deazaadenin-2'-yl $N^4$-benzoyl-1-β-D-arabinofuranosylcytosin-5'-yl phosphate and $N^6$-propionyl-9-β-D-ribofuranosyl-7-deazaadenin-3'-yl $N^4$-benzoyl-1-β-D-arabinofuranosylcytosin-5'-yl phosphate.

In the manner given in Examples 17 and 18, other N-acyl-2'-5'- and 3',5'-phosphates of Formulae Va and Vb (Z'=NHAcyl) as prepared in Example 10, can be partially hydrolyzed to give the corresponding N-acyldinucleoside phosphates of the formulae below:

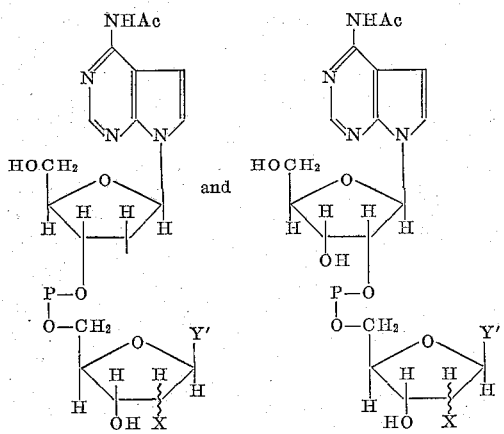

wherein Ac, X and Y' have the same significance as hereinbefore. Representative compounds thus produced include:

$N^6$-phenylacetyl-9-$\beta$-D-ribofuranosyl-7-deazaadenin-2'-yl 1-$\beta$-D-deoxyribofuranosylthymin-5'-yl phosphate;
$N^6$-phenylpropionyl-9-$\beta$-D-ribofuranosyl-7-deazaadenin-3'-yl 1-$\beta$-D-deoxyribofuranosylthymin-5'-yl phosphate;
$N^6$-phenylpropionyl-9-$\beta$-D-ribofuranosyl-7-deazaadenin-2'-yl 1-$\beta$-D-ribofuranosylcytosin-5'-yl phosphate;
$N^6$-phenylpropionyl-9-$\beta$-D-ribofuranosyl-7-deazaadenin-3'-yl 1-$\beta$-D-ribofuranosylcytosin-5'-yl phosphate;
$N^6$-lauroyl-9-$\beta$-D-ribofuranosyl-7-deazaadenin-2'-yl 9-$\beta$-D-deoxyribofuranosylxanthin-5'-yl phosphate;
$N^6$-lauroyl-9-$\beta$-D-ribofuranosyl-7-deazaadenin-3'-yl 9-$\beta$-D-deoxyribofuranosylxanthin-5'-yl phosphate;
$N^6$-butyryl-9-$\beta$-D-ribofuranosyl-7-deazaadenin-2'-yl $N^2,N^6$-diacetyl-$\beta$-D-ribofuranosyl-2,6-diamino-7-deazapurin-5'-yl phosphate;
$N^6$-butyryl-9-$\beta$-D-ribofuranosyl-7-deazaadenin-3'-yl $N^2,N^6$-diacetyl-9-$\beta$-D-ribofuranosyl-2,6-diamino-7-deazapurin-5'-yl phosphate;
$N^6$-valeryl-9-$\beta$-D-ribofuranosyl-7-deazaadenin-2'-yl 1-$\beta$-D-deoxyribofuranosyl-trifluoromethyluracil-5'-yl phosphate;
$N^6$-valeryl-9-$\beta$-D-ribofuranosyl-7-deazaadenin-3'-yl 1-$\beta$-D-deoxyribofuranosyl-trifluoromethyluracil-5'-yl phosphate;
$N^6$-hexanoyl-9-$\beta$-D-ribofuranosyl-7-deazaadenin-3'-yl $N^2$-benzoyl-9-$\beta$-D-arabinofuranosylguanin-5'-yl phosphate;
$N^6$-hexanoyl-9-$\beta$-D-ribofuranosyl-7-deazaadenin-3'-yl $N^2$-benzoyl-9-$\beta$-D-arabinofuranosylguanin-5'-yl phosphate;
$N^6$-octanoyl-9-$\beta$-D-ribofuranosyl-7-deazaadenin-2'-yl $N^4$-anisoyl-1-$\beta$-D-arabinofuranosyl-3-methylcytosin-5'-yl phosphate;
$N^6$-octanoyl-9-$\beta$-D-ribofuranosyl-7-deazaadenin-3'-yl $N^4$-anisoyl-1-$\beta$-D-arabinofuranosyl-3-methylcytosin-5'-yl phosphate;
$N^6$-acetyl-9-$\beta$-D-ribofuranosyl-7-deazaadenin-2'-yl $N^4$-acetyl-1-$\beta$-D-ribofuranosyl-5-methylcytosin-5'-yl phosphate;
$N^6$-acetyl-9-$\beta$-D-ribofuranosyl-7-deazaadenin-3'-yl $N^4$-acetyl-1-$\beta$-D-ribofuranosyl-5-methylcytosin-5'-yl phosphate;
$N^6$-decanoyl-9-$\beta$-D-ribofuranosyl-7-deazaadenin-2'-yl $N^6$-phenylacetyl-9-$\beta$-D-deoxyribofuranosyladenin-5'-yl phosphate;
$N^6$-decanoyl-9-$\beta$-D-ribofuranosyl-7-deazaadenin-3'-yl $N^6$-phenylpropionyl-9-$\beta$-D-deoxyribofuranosyladenin-5'-yl phosphate;
$N^6$-benzoyl-9-$\beta$-D-ribofuranosyl-7-deazaadenin-3'-yl $N^6$-benzoyl-9-$\beta$-D-ribofuranosyl-7-deazaadenin-5'-yl phosphate;
$N^6$-benzoyl-9-$\beta$-D-ribofuranosyl-7-deazaadenin-3'-yl-$N^6$-benzoyl-9-$\beta$-D-ribofuranosyl-7-deazaazedin-5'-yl phosphate, and the like.

I claim:
1. A compound selected from the group consisting of 2',5' and 3',5'-dinucleoside phosphates having the formulae:

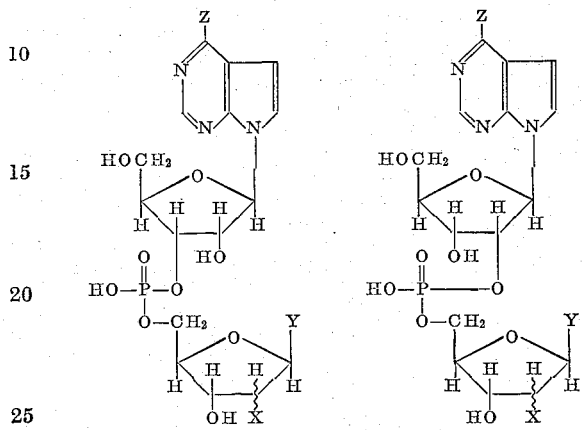

wherein X is selected from the group consisting of hydrogen, $\alpha$-hydroxy and $\beta$-hydroxy, wherein Z is selected from the group consisting of hydrogen, hydroxy, amino, acylamino, in which the acyl group is of a hydrocarbon carboxylic acid containing from 2 to 12 carbon atoms, inclusive, thio and alkylthio in which the alkyl group has from 1 to 4 carbon atoms, inclusive, wherein Y is selected from the group consisting of cytosin-1-yl, uracil-1-yl, thymin-1-yl, adenin-9-yl, guanin-9-yl, 6-mercaptopurin-9-yl, uracil-3-yl, 5-fluorouracil-1-yl, 5-chlorouracil-1-yl, 5-bromouracil-1-yl, 5-iodouracil-1-yl, 5-trifluoromethyluracil-1-yl, hypoxanthin-9-yl, xanthin-9-yl, 5-methylcytosin-1-yl, 3-methylcytosin-1-yl, 2,6-diaminopurin-9-yl, 5-hydroxymethylcytosin-1-yl, 7-deazaadenin-9-yl, 6-mercapto-7-deazapurin-9-yl, 7-deazahypoxanthin-9-yl, and 6-azauracil-1-yl.

2. 9-$\beta$-ribofuranosyl-7-deazaadenin-2'-yl 1-$\beta$-D-deoxyribofuranosylthymin-5'-yl phosphate.

3. 9-$\beta$-D-ribofuranosyl-7-deazaadenin-3'-yl 1 - $\beta$ - D-deoxyribofuranosylthymin-5'-yl phosphate.

4. 9-$\beta$-D-ribofuranosyl-7-deazaadenin-2'-yl 1-$\beta$-D - arabinofuranosylcytosin-5'-yl phosphate.

5. 9-$\beta$-D-ribofuranosyl-7-deazaadenin-3'-yl 1-$\beta$ - D-arabinofuranosylcytosin-5'-yl phosphate.

6. 6-$\beta$-D-ribofuranosyl-6-mercapto-7-deazapurin-3' - yl 1-$\beta$-D-deoxyribofuranosyluracil-5'-yl phosphate;

7. 9-$\beta$-D-ribofuranosyl-6-mercapto-7-deazapurin-3' - yl 1-$\beta$-D-deoxyribofuranosyluracil-5'-yl phosphate.

8. A compound selected from the group consisting of 2', 5'- and 3', 5'-dinucleoside phosphates having the Formulae XI and XII:

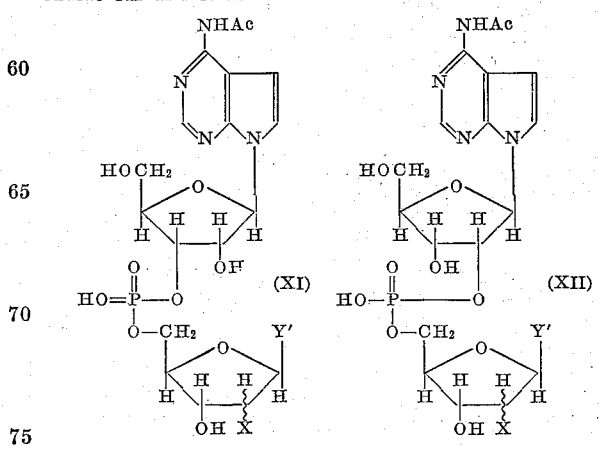

wherein Ac is the acyl radical of a hydrocarbon carboxylic acid containing from 2 to 12 carbon atoms, inclusive, wherein X is selected from the group consisting of hydrogen, α-hydroxy and β-hydroxy and wherein Y' is selected from the group consisting of $N^4$-acylcytosin-1-yl, uracil-1-yl, thymin-1-yl, $N^6$-acyladenin-9-yl, $N^2$-acylguanin-9-yl, 6-mercaptopurin-9-yl, uracil-3-yl, 5-fluorouracil-1-yl, 5-chlorouracil-1-yl, 5-bromouracil-1-yl, 5-iodouracil-1-yl, 5-trifluoromethyl-1-yl, hypoxanthin-9-yl, xanthin-9-yl, $N^4$-acyl-5-methylcytosin-1-yl, $N^4$-acyl-3-methylcytosin-1-yl, $N^2,N^6$-bis(acylamino)purin-9-yl; $N^4$-acyl-5-O-acylmethylcytosin-1-yl, $N^6$-acyl-7-deazaadenin-9-yl; 6-mercapto-7-deazapurin-9-yl; 7-deazahypoxanthin-9-yl; and 6-azauracil-1-yl, in which the acyl group is defined as hereinabove.

9. $N^6$-propionyl-9-β-D-ribofuranosyl-7-deazaadenin-2'-yl $N^4$-benzoyl-1-β-D-arabinofuranosylcytosin-5'-yl phosphate.

10. $N^6$-propionyl-9-β-D-ribofuranosyl-7-deazaadenin-3'-yl $N^4$-benzoyl-1-β-D-arabinofuranosylcytosin-5'-yl phosphate.

11. A compound selected from the group consisting of 2',5' and 3',5'-dinucleoside phosphates having the formulae:

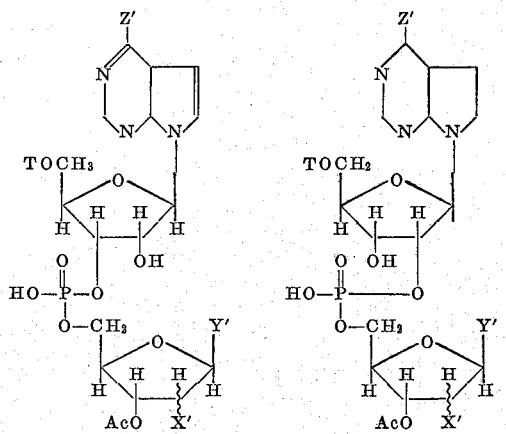

wherein Ac is the acyl radical of a hydrocarbon carboxylic acid containing from 2 to 12 carbon atoms, inclusive, wherein T is selected from the group consisting of triphenylmethyl, (p-methoxyphenyl)diphenylmethyl and bis-(p-methoxyphenyl)phenylmethyl; wherein X' is selected from the group consisting of hydrogen, α-OAc and β-OAc in which Ac is defined as above; wherein Y' is selected from the group consisting of $N^4$-acylcytosin-1-yl, uracil-1-yl, thymin-1-yl, $N^6$-acyladenin-9-yl, $N^2$-acylguanin-9-yl, 6-mercaptopurin-9-yl, uracil-3-yl, 5-fluorouracil-1-yl, 5-chlorouracil-1-yl, 5-bromouracil-1-yl, 5-iodouracil-1-yl, 5-trifluoromethyluracil-1-yl, hypoxanthin-9-yl, xanthin-9-yl, $N^4$-acyl-5methylcytosin-1-yl, $N^4$-acyl-3-methylcytosin-1-yl, $N^2,N^6$-bis(acylamino)purin-9-yl; $N^4$-acyl-5-O-acylmethylcytosin-1-yl, $N^6$-acyl-7-deazaadenin-9-yl; 6-mercapto-7-deazapurin-9-yl; 7-deazahypoxanthin-9-yl; and 6-azauracil-1-yl, wherein the acyl group is Ac, defined as hereinabove; and wherein Z' is selected from the group consisting of hydrogen, hydroxy, acylamino, in which acyl is defined as above, thio and alkylthio, in which the alkyl group has from 1 to 4 carbon atoms, inclusive, 12. $N^6$-benzoyl-9-[5'-O-(p-methoxyphenyl)diphenyl-β-D-ribofuranosyl]7-deazaadenin-2'-yl 1-(3'-O-acetyl-β-D-deoxyribofuranosyl)thymin-5'-yl phosphate.

13. $N^6$-benzoyl-9-[5'-O-(p-methoxyphenyl)diphenylmethyl-β-D-ribofuranosyl]7-deazaadenin-3'-yl 1-(3'-O-aceytl-β-D-deoxyribofuranosyl)thymin-5'-yl phosphate.

14. 9-(5'-O-triphenylmethyl-β-D-ribofuranosyl)-7-deazapurin-2'-yl $N^4$-benzoyl-1-(2',3'-di-O-benzoyl-β-D-arabinofuranosyl)cytosin-5'-yl.

15. 9-(5'-O-triphenylmethyl-β-D-ribofuranosyl)-7-deazapurin-3'-yl $N^4$-benzoyl-1-(2',3'-di-O benzoyl-β-D-arabinofuranosyl)-cytosin-5'-yl phosphate.

16. $N^6$-benzoyl-9-(5'-O-triphenylmethyl-β-D-ribofuranosyl)-7-deazaadenin-2'-yl $N^4$-benzoyl-1-(2',3'-di-O-benzoyl-β-D-arabinofuranosyl)cytosin-5'-yl phosphate.

17. $N^6$-benzoyl-9-(5'-O-triphenylmethyl-β-D-ribofuranosyl)-7-deazaadenin-3'-yl $N^4$-benzoyl-1-(2',3'-di-O-benzoyl-β-D-arabinofuranosyl)cytosin-5'-yl phosphate.

18. $N^6,N^6$-dibenzoyl-9-(2',3',5'-O-tribenzoyl-β-D-ribofuranosyl)7-deazaadenine.

19. $N^6$-benzoyl-9-[5'-O-(p-methoxyphenyl)diphenylmethyl-β-D-ribofuranosyl)-7-deazaadenine.

20. A process for the production of a compound selected from the group consisting of 2',5'- and 3',5'-dinucleoside phosphates having the formulae:

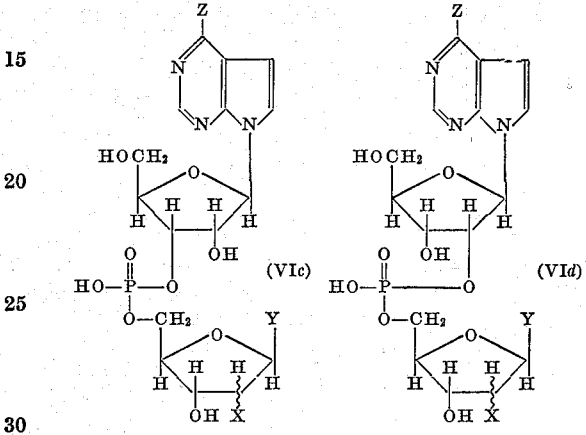

wherein X is selected from the group consisting of hydrogen, α-hydroxy and β-hydroxy, wherein Z is selected from the group consisting of hydrogen, hydroxy, amino, acylamino, in which the acyl group is of a hydrocarbon carboxylic acid containing from 2 to 12 carbon atoms, inclusive, thio and alkylthio in which the alkyl group has from 1 to 4 carbon atoms, inclusive, wherein Y is selected from the group consisting of cytosin-1-yl, uracil-1-yl, thymin-1-yl, adenin-9-yl, guanin-9-yl, 6-mercaptopurin-9-yl, uracil-3-yl, 5-fluorouracil-1-yl, 5-chlorouracil-1-yl, 5-bromouracil-1-yl, 5-iodouracil-1-yl, 5-trifluoromethyluracil-1-yl, hypoxanthin-9-yl, xanthin-9-yl, 5-methylcytosin-1-yl, 3-methylcytosin-1-yl, 2,6-diaminopourin-9-yl, 5-hydroxymethylcytosin-1-yl, 7-deazaadenin-9-yl, 6-mercapto-7-deazapurin-9-yl, 7-deazahypoxanthin-9-yl and 6-azauracil-1-yl, which comprises: condensing a 9-β-D-ribofuranosyl-7-deazapurin of the Formula IV:

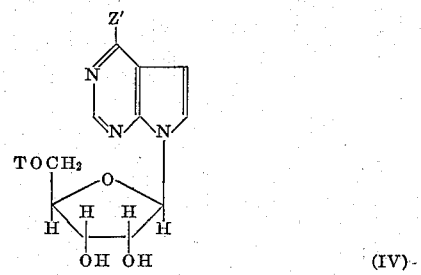

wherein T is selected from the group consisting of triphenylmethyl, (p-methoxyphenyl)diphenylmethyl and bis (p-methoxyphenyl)phenylmethyl, wherein Z' is selected from the group consisting of hydrogen, hydroxy, acylamino, defined as above, thio and alkylthio, in which the alkyl group has from 1 to 4 carbon atoms, inclusive, with a compound of the Formula XII:

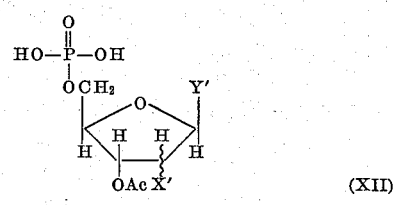

wherein X' is selected from the group consisting of hydrogen, α-OAc and β-OAc in which Ac is an acyl group, defined as above: and wherein Y' is selected from the group consisting of N⁴-acylcytosin-1-yl, uracil-1-yl, thymin-1-yl, N⁶-acyladenin-9-yl, N²-acylguanin-9-yl, 6-mercaptopurin-9-yl, uracil-3-yl, 5-fluorouracil-1-yl, 5-chlorouracil-1-yl, 5-bromouracil-1-yl, 5-iodouracil-1-yl, 5-trifluoromethyluracil-1-yl, hypoxanthin-9-yl, xanthin-9-yl, N⁴-acyl-5-methylcytosin-1-yl, N⁴-acyl - 3 - methylcytosin-1-yl N²,N⁶-bis(acylamino)purin-9-yl; N⁴-acyl-5-O-acylmethylcytosin-1-yl, N⁶-acyl-7-deazaadenin-9-yl; 6 - mercapto-7-deazapurin-9-yl; 7-deazahypoxanthin-9-yl; and 6-azauracil-1-yl, wherein the acyl group is defined as hereinbefore, in the presence of a carbodiimide condensing agent, to give a mixture of compounds having the formulae:

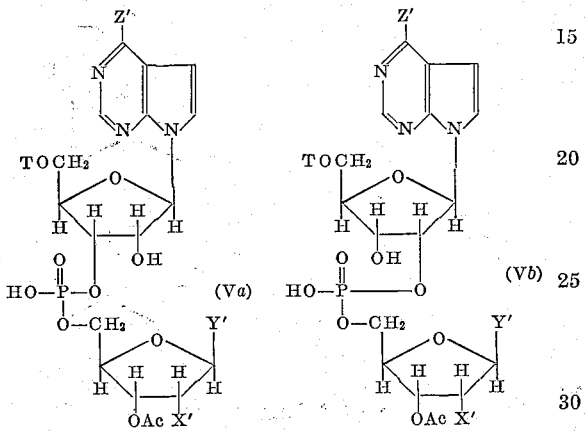

wherein Ac, T, X', Y', Z' are defined as hereinabove and hydrolysing consecutively with a base at a temperature between about 20° and about 100° C., and then an acid to obtain the products of Formulae VIc and VId above.

21. The process of claim 20, wherein the starting material is an N₆-acyl-9-(5'T-β-D-ribofuranosyl)7-deazaadenine in which acyl is the acyl radical of a hydrocarbon carboxylic acid containing from 2 to 12 carbon atoms and wherein T is a selected member of the group consisting of triphenylmethyl, (p-methoxyphenyl)diphenylmethyl and bis(p-methoxyphenyl)phenylmethyl.

22. A process of claim 20 wherein the carbodiimide is N,N'-dicyclohexylcarbodiimide.

23. The process of claim 20 in which the starting material is N⁶ - benzoyl-9-[5'-(p-methoxyphenyl)diphenylmethyl β-D-ribofuranosyl)7-deazaadenine, the reactant is 1 - (3'-acetyl-β-D-deoxyribofuranosyl)thymin-5'-yl phosphate, the condensing agent is N,N'-dicyclohexylcarbodiimide and the resulting products are: 9-β-D-ribofuranosyl-7 - deazaadenin-2' - yl 1-β-D-deoxyribofuranosylthymin-5'-yl phosphate and 9-β-D-ribofuranosyl-7-deazaadenin-3'-yl 1-β-D-deoxyribofuranosylthymin-5'-yl phosphate.

24. A process for the production of a compound selected from the group consisting of 2',5' and 3',5'-dinucleoside phosphates having the Formulae VIa and VIb:

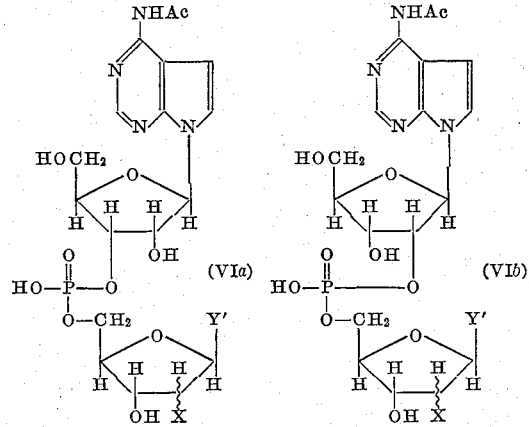

wherein Ac is the acyl radical of a hydrocarbon carboxylic acid containing from 2 to 12 carbon atoms, inclusive, wherein X is selected from the group consisting of hydrogen, α-hydroxy and β-hydroxy, and wherein Y' is selected from the group consisting of N⁴-acylcytosin-1-yl, uracil-1-yl, thymin-1-yl, N⁶-acyladenin-9-yl, N²-acylguanin - 9-yl, 6-mercaptopurin-9-yl, uracil-3-yl, 5-fluorouracil-1-yl, 5-chlorouracil-1-yl, 5-bromouracil-1-yl, 5-iodouracil-1-yl, 5-trifluoromethyluracil-1-yl, hypoxanthin-9-yl, xanthin-9-yl, N⁴-acyl-5-methylcytosin-1-yl, N⁴-acyl - 3 - methylcytosin-1-yl, N²,N⁶-bis(acylamino)purin-9 - yl, N⁴ - acyl - 5 - hydroxymehylcytos-1-yl, N⁶-acyl-7-deazaadenin-9-yl; 6-mercapto-7-deazapurin-9-yl; 7-deazahypoxanthin-9-yl; and 6-azauracil-1-yl, in which the acyl group is defined as hereinabove which comprises: condensing an N⁶ - acyl - 9-(5'-T-β-D-ribofuranosyl)7-deazaadenine, wherein the acyl group is defined as above and werein T is selected from the group consisting of triphenylmethyl, (p-methoxyphenyl)diphenylmethyl and bis(p-methoxyphenyl)phenylmethyl with a compound of Formula XII:

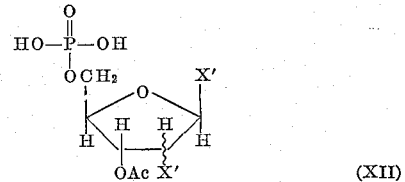

wherein X' is selected from the group consisting of hydrogen, α-OAc and β-OAc in which Ac is defined as above; and wherein Y' is selected from the group consisting of N⁴-acylcytosin-1-yl, uracil-1-yl, thymin-1-yl, N-acyladenin-9-yl, N-acylguanin-9-yl, 6-mercaptopurin-9-yl, uracil-3-yl, 5-fluorouracil-1-yl, 5-chlorouracil-1-yl, 5-bromouracil-1-yl, 5 - iodouracil - 1-yl, 5-triflouromethyluracil-1-yl, hypoxanthin-9-yl, xanthin-9-yl, N-acyl-5-methylcytosin-1-yl, N⁴-acyl-3-methylcytosin-1-yl, N²,N⁶-bis-acylamino) purin-9-yl; N⁴-acyl-5-O-acylmethylcytosin-1-yl, N⁶-acyl-7 - deazaadenin - 9-yl; 6-mercapto-7-deazapurin-9-yl; 7-deazahypoxanthin-9-yl; and 6-azouracil-1-yl, wherein the acyl group is defined as hereinabove; in the presence of a carbodiimide condensing agent, to obtain a mixture of the two compounds having the formulae:

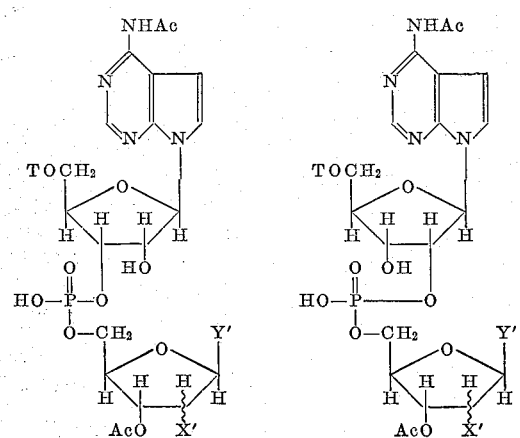

wherein Ac, T, X' and Y' are defined as hereinabove and hydrolyzing at a temperature between 0° and 10° C. with a base and thereupon with an acid to obtain the compounds of Formulae VIa and VIb.

References Cited by the Examiner

Jacob et al.: "Chem. Abst." vol. 57, 1962, pp. 15218–15219.

ELBERT L. ROBERTS, *Primary Examiner.*

JOHNNIE R. BROWN, *Assistant Examiner.*

UNITED STATES PATENT OFFICE
CERTIFICATE OF CORRECTION

Patent No. 3,309,358                                March 14, 1967

Arthur R. Hanze

It is hereby certified that error appears in the above numbered patent requiring correction and that the said Letters Patent should read as corrected below.

Column 10, line 54, for "u/mhg." read -- u/mg. --; column 14, lines 66 and 67, for "(p-methoxyphenyl-methyl-β-" read -- (p-methoxyphenyl)diphenyl-methyl-β- --; column 40, line 51, for "6-β-D-" read -- 9-β-D- --; column 43, line 37, for "$N_6$-acyl-" read -- $N^6$-acyl- --.

Signed and sealed this 7th day of November 1967.

(SEAL)
Attest:

Edward M. Fletcher, Jr.                         EDWARD J. BRENNER
Attesting Officer                              Commissioner of Patents